(12) United States Patent
Terada et al.

(10) Patent No.: US 7,489,451 B2
(45) Date of Patent: *Feb. 10, 2009

(54) TAKING LENS SYSTEM AND IMAGE CAPTURING APPARATUS

(75) Inventors: Mamoru Terada, Sakai (JP); Kenshi Nabeta, Osaka (JP); Toru Nakatani, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 443 days.

This patent is subject to a terminal disclaimer.

(21) Appl. No.: 11/319,872

(22) Filed: Dec. 27, 2005

(65) Prior Publication Data

US 2006/0140606 A1 Jun. 29, 2006

(30) Foreign Application Priority Data

Dec. 27, 2004 (JP) ............................. 2004-376127

(51) Int. Cl.
*G02B 15/14* (2006.01)
*G03B 17/00* (2006.01)
(52) U.S. Cl. .......................... 359/687; 359/684; 396/72
(58) Field of Classification Search .................. 396/72, 396/73, 101, 530, 544; 348/240.99, 345; 348/373; 359/680–689
See application file for complete search history.

(56) References Cited

U.S. PATENT DOCUMENTS

| 5,694,252 | A | 12/1997 | Yahagi | 359/684 |
| 7,180,682 | B1* | 2/2007 | Terada | 359/687 |
| 7,206,137 | B2* | 4/2007 | Nakatani et al. | 359/687 |
| 7,339,748 | B2* | 3/2008 | Terada et al. | 359/687 |
| 2007/0279759 | A1* | 12/2007 | Hozumi et al. | 359/680 |

FOREIGN PATENT DOCUMENTS

JP 09-90221 A 4/1997

* cited by examiner

*Primary Examiner*—Melissa J Koval
(74) *Attorney, Agent, or Firm*—Sidley Austin LLP

(57) ABSTRACT

A taking lens system is provided with, from the side of the object to be photographed, a first lens unit (G1) having positive optical power, a second lens unit (G2) having negative optical power, a third lens unit (G3) having positive optical power and a fourth lens unit (G4) having positive optical power. Zooming is performed by moving the first to fourth lens units (G1) to (G4), and focusing is performed by moving the fourth lens unit (G4). When the distance from the most object-to-be-photographed side surface (r1) of the first lens unit (G1) to the imaging surface at the wide angle end is TLw, the overall focal length of the taking lens system at the telephoto end is ft, the overall focal length of the taking lens system at the wide angle end is fw, and the focal length of the first lens unit (G1) is fl, relationships $0.5 \leq TLw/ft \leq 1.0$ and $6.0 \leq fl/fw \leq 20.0$ are satisfied.

10 Claims, 12 Drawing Sheets

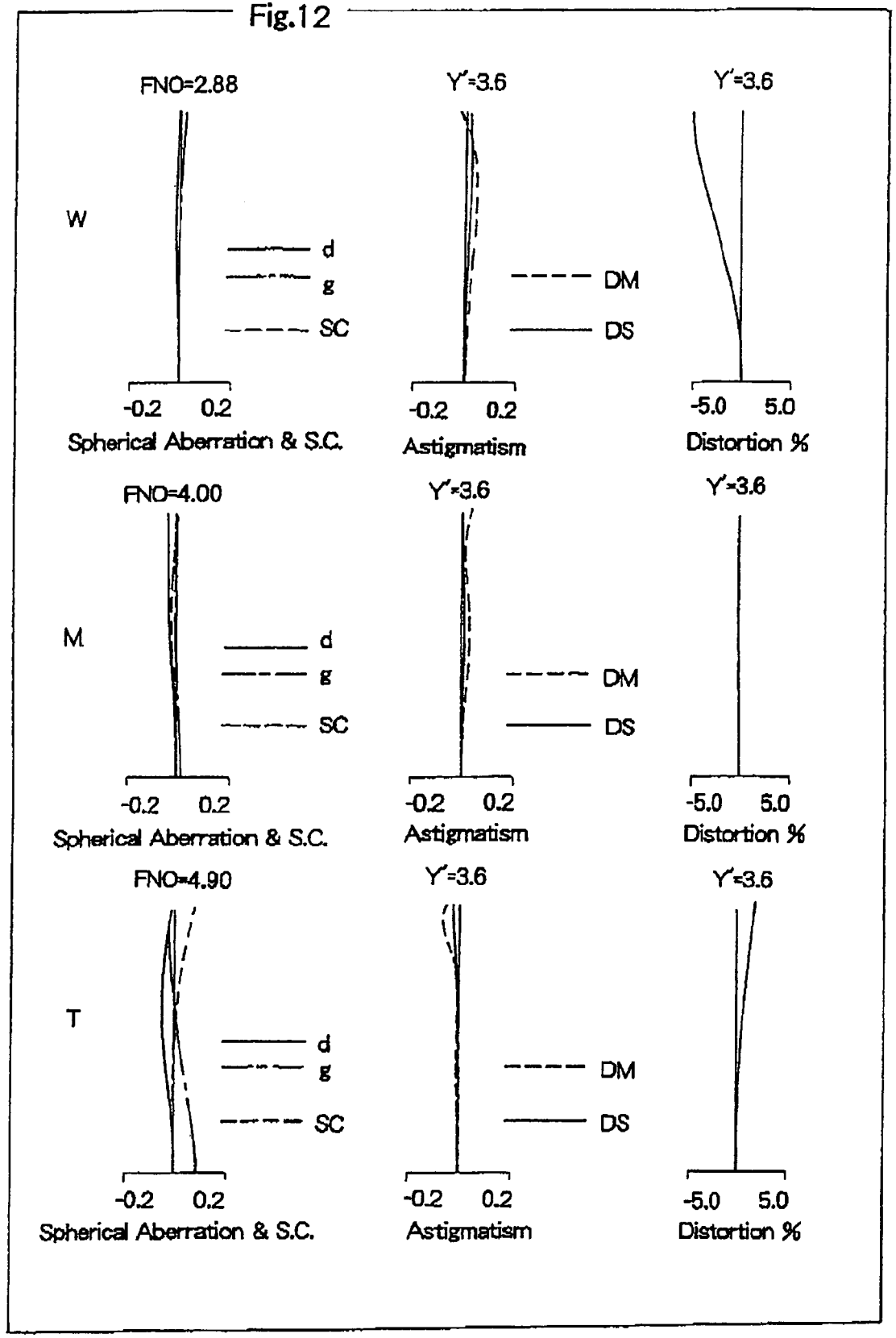

TAKING LENS SYSTEM AND IMAGE CAPTURING APPARATUS

This application is based on application No. 2004-376127 filed in Japan, the content of which is hereby incorporated by reference.

BACKGROUND OF THE INVENTION

1. Field of the Invention

The present invention relates to a taking lens system and an image capturing apparatus, and more particularly, to a taking lens system where the image capturing magnification is variable and the zoom ratio is high.

2. Description of the Related Art

In recent years, with the spread of personal computers, digital cameras capable of easily capturing images have been becoming widespread. Moreover, the incorporation of a digital camera into information processing apparatuses such as mobile computers, mobile telephones and personal digital assistants (PDAs) has become common under such circumstances, smaller-size digital still cameras are required, and taking lens systems are also required to be smaller in size.

Moreover, image sensors that convert light into electric signals have been becoming more sophisticated in the number of pixels and other various points, and the product cycles of digital cameras tend to decrease. For this reason, taking lens systems are not only required to be small in size but also required to be high in performance and easy to manufacture.

Further, zoom lens systems are used as the taking lens systems of digital cameras, and it is also required to increase the zoom ratio to twice or higher than the conventional ratio of approximately 2 to 5. Zoom lens systems having an extremely high zoom ratio that can satisfy this requirement have conventionally been known.

However, although having a high zoom ratio, conventional zoom lens systems cannot be said to be small in size or high is performance.

SUMMARY OF THE INVENTION

The present invention is made in view of such circumstances, and an object thereof is to provide a taking lens system that has an extremely high zoom ratio and is small in size, high in performance and easy to manufacture. Another object thereof is to provide a small-size, high-performance and low-cost image capturing apparatus having such a taking lens system.

To attain the above-mentioned objects, according to a first aspect of the present invention, a taking lens system that images light from the object to be photographed on the image sensor at least comprises, from the side of the object to be photographed, a first lens unit having positive optical power, a second lens unit having negative optical power, a third lens unit having positive optical power and a fourth lens unit having positive optical power. Zooming is performed by moving at least the first lens unit, and the relationships of the following expressions 1 and 2 are satisfied:

$$0.5 \leq TLw/ft \leq 1.0 \quad (1)$$

$$6.0 \leq fl/fw \leq 20.0 \quad (2)$$

where $TLw$ is the distance from the most object-to-be-photographed side surface of the first lens unit to the imaging surface at the wide angle end, $ft$ is the overall focal length of the taking lens system at the telephoto end, $fw$ is the overall focal length of the taking lens system at the wide angle end, and $fl$ is the focal length of the first lens unit.

With this structure, a small-size lens system where the zoom ratio is extremely high and aberrations are excellently suppressed is obtained. Moreover, since it is not necessary to increase the number of lens elements or aspherical surfaces for aberration correction, the lens system can be structured in small size and manufacture is easy. By providing such a taking lens system, a small-size and high-performance image capturing apparatus can be structured at low cost.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

FIG. 12 is a view showing aberrations, at the wide angle end, in the middle focal length condition and at the telephoto end, of the taking lens system of the digital camera according to the fifth embodiment.

DETAILED DESCRIPTION OF THE PREFERRED EMBODIMENTS

Figure 1A:
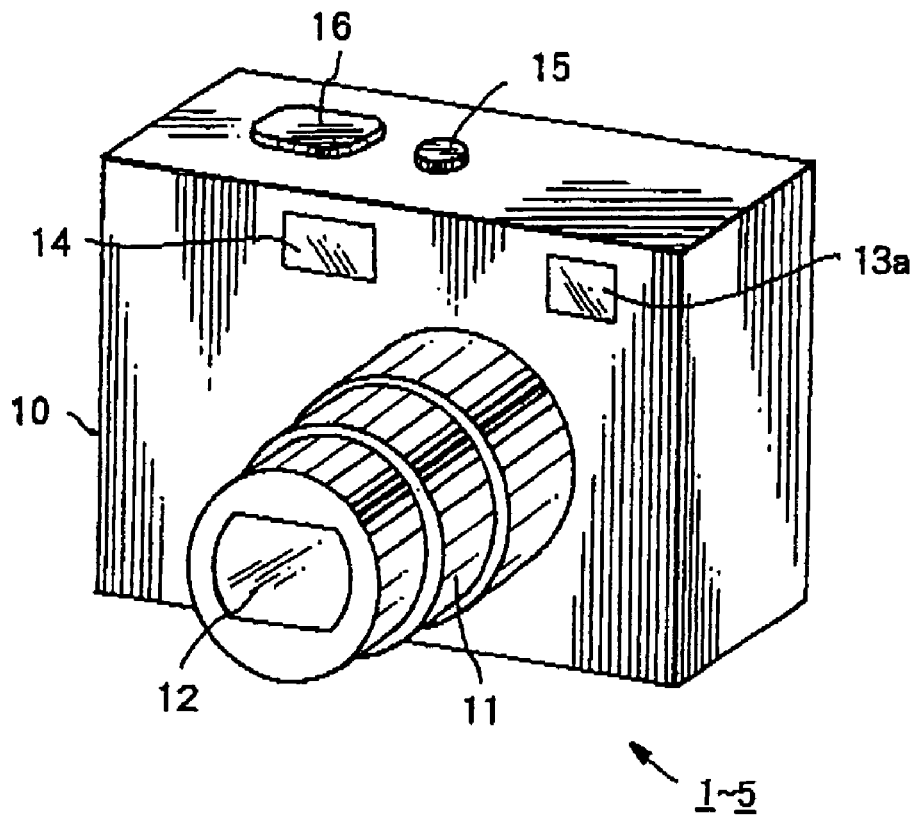
FIGS. 1A and 1B are views schematically showing the appearance of a digital camera according to the embodiments.
Figure 1B:
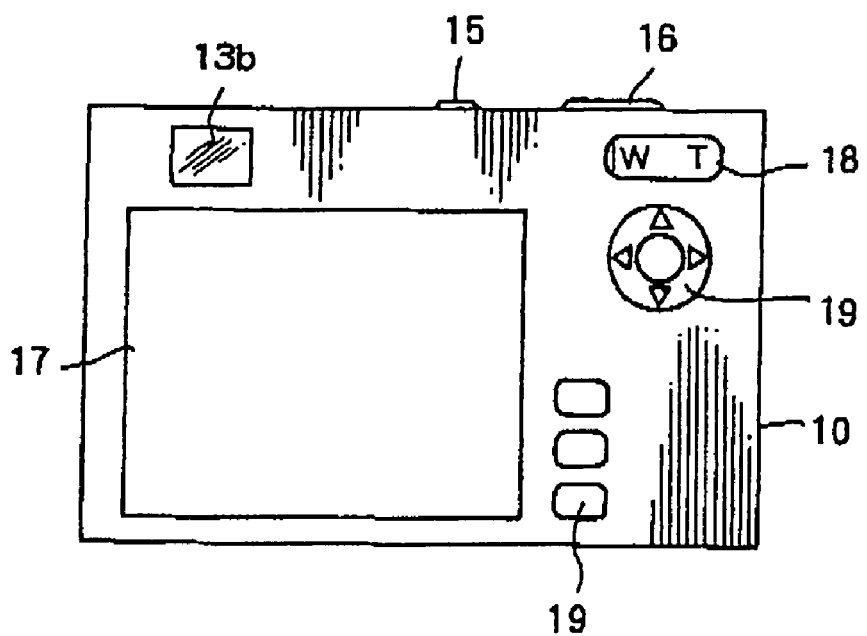

Hereinafter, embodiments of the present invention will be described with reference to the drawings. FIGS. 1A and 1B schematically show a digital camera 1 according to a first embodiment. The appearance of the digital camera 1 is common to the embodiments. The digital camera 1 comprises a body 10 and a lens barrel 11 attached to the body 10. The lens barrel 11 comprises a plurality of barrels, and is movable backward and forward so as to protrude forward from the body 10 at the time of photographing and collapse into the body 10 when photographing is not performed. The lens barrel 11 contains and holds a taking lens system 12.

The taking lens system 12 directs light from the object to be photographed to an image sensor 21 (see FIG. 2) contained in the body 10, and images the light on the image sensor 21. The focal length of the taking lens system 12 is variable, that is, the taking lens system 12 is a zoom lens system.

The digital camera 1 has an objective window 13$a$ of an optical viewfinder and a flash light emitter 14 on its front surface, has a power button 15 and a shutter start button 16 on its top surface, and has an eye window 13$b$ of the optical finder, a display 17, a zoom button 18 and other operation buttons 19 on its back surface. The optical finder provides an optical image of the object to be photographed, and the flash light emitter 14 emits flash light that illuminates the object to be photographed. The power button 15 is operated to provide an instruction to start or stop the power supply to the image sensor 21 and other portions that operate on electric power, and the shutter start button 16 is operated to provide an instruction to take an image for recording.

The display 17 comprises a liquid crystal display, and displays taken images and various pieces of information such as the setting status of the digital camera 1 and operation guides. The zoom button 18 is operated to set the focal length of the taking lens system 12. When one end of the zoom button 18 is depressed, the focal length of the taking lens system 12 changes so as to increase, so that the photographing angle of view decreases and the photographing magnification increases. When the other end of the zoom button 18 is depressed, the focal length of the taking lens system 12 changes so as to decrease, so that the photographing angle of view increases and the photographing magnification decreases. Of the settable range of the focal length of the taking lens system 12, the longest focal length condition will be referred to as telephoto end, and the shortest focal length condition, as wide angle end. The operation button 19 is operated to make various settings of the digital camera 1.

Figure 2:
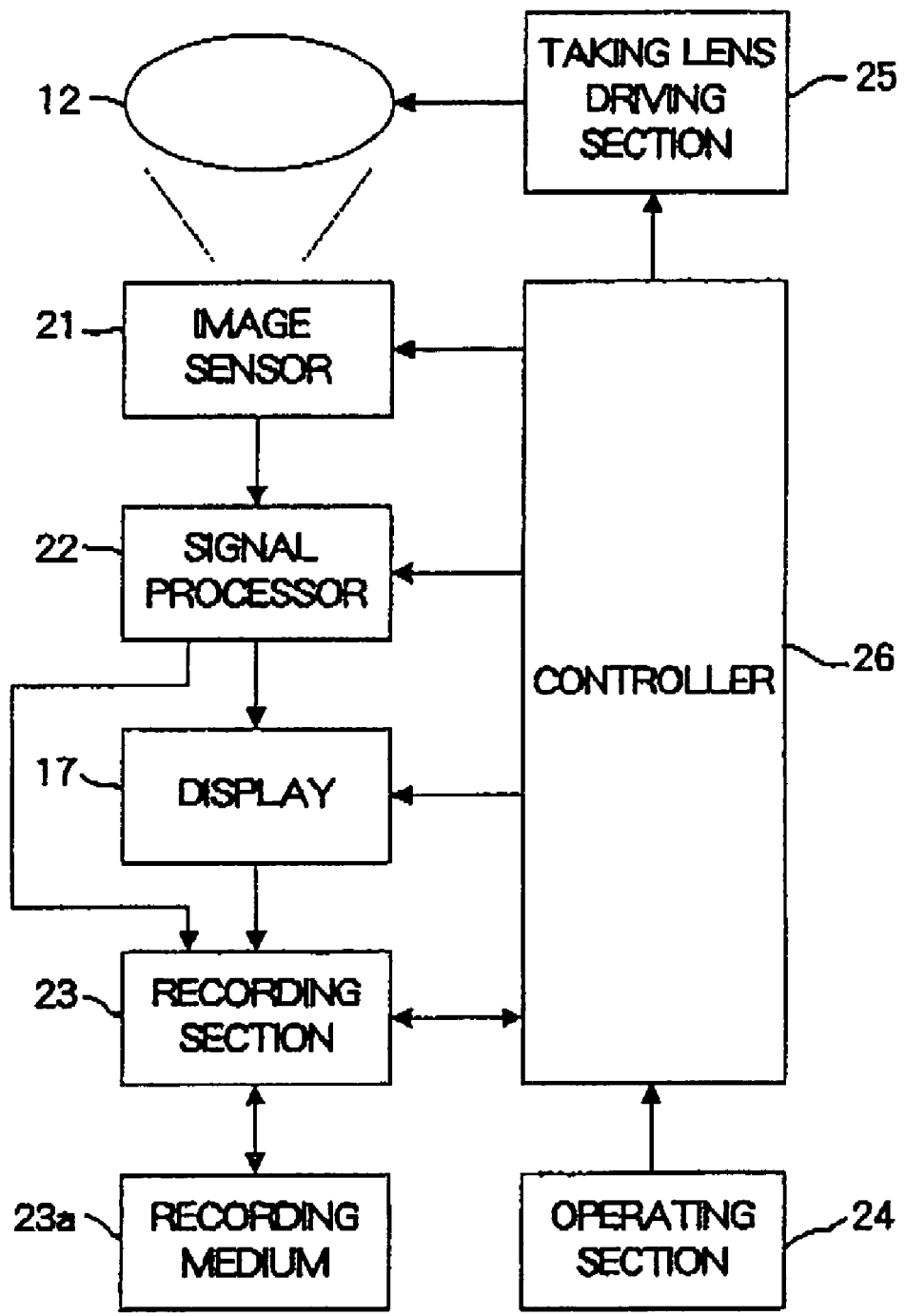
FIG. 2 is a view schematically showing the structure of the digital camera according to the embodiments.

FIG. 2 schematically shows the structure of the digital camera 1. The structure of the digital camera 1 shown in FIG. 2 is common to the embodiments. In addition to the taking lens system 12 and the display 17, the digital camera 1 comprises the image sensor 21, a signal processor 22, a recorder 23, an operation portion 24, a taking lens system driver 25 and a controller 26. The image sensor 21 is a CCD area sensor, and outputs a signal representative of the light reception amount of each pixel. The signal processor 22 processes the output signal of the image sensor 21 to generates image data representative of the taken image. The recorder 23 records the image data generated by the signal processor 22 onto a detachably attachable recording medium 23$a$, and reads the image data from the recording medium 23$a$ for playing back the image. The operation portion 24 is a generic name of the above-mentioned operation buttons 16 to 19, and transmits the user's operation to the controller 26.

The taking lens system driver 25 has some motors and a transmission mechanism (not shown) that transmits the driving forces of the motors to lens units of the taking lens system 12, and performs the setting of the focal length of the taking lens system 12 and focusing. The controller 26 controls each portion in response to an instruction provided through the operation portion 24.

Next, embodiments of the taking lens system will be described. The taking lens system that images light from the object to be photographed on the image sensor at least comprises, from the side of the object to be photographed, a first lens unit having positive optical power, a second lens unit having negative optical power, a third lens unit having positive optical power and a fourth lens unit having positive optical power, and it is preferable that zooming be performed by moving at least the first lens unit and the relationships of the following expressions 1 and 2 be satisfied:

$$0.5 \leq TLw/ft \leq 1.0 \quad (1)$$

$$6.0 \leq fl/fw \leq 20.0 \quad (2)$$

where TLw is the distance from the most object-to-be-photographed side surface of the first lens unit to the imaging surface at the wide angle end, ft is the overall focal length of the taking lens system at the telephoto end, fw is the overall focal length of the taking lens system at the wide angle end, and fl is the focal length of the first lens unit.

The expression 1 defines an appropriate relationship between the overall length at the wide angle end and the focal length at the telephoto end, that is, the longest focal length. In a case where a high zoom ratio is ensured, when the value of TLw/ft exceeds the upper limit of the expression 1, the overall length at the wide angle limit is large or the angle of view at the wide angle limit is large. That the overall length at the wide angle end is large is a direct obstacle to size reduction, and that the angle of view at the wide angle end is large results in an increase in the diameter of the front lens, which is an indirect obstacle to size reduction.

When the value of TLw/ft does not reach the lower limit of the expression 1, the overall length at the wide angle end is too small and the zoom ratio is too high, so that it is difficult to ensure performance. To ensure high performance, it is necessary to increase the number of lens elements or aspherical surfaces, which hinders the facilitation of manufacture.

By satisfying the relationship of the following expression 1' instead of the expression 1, a smaller-size and higher-performance taking lens system is obtained:

$$0.75 \leq TLw/ft \leq 1.0 \quad (1')$$

The expression 2 is a division of the focal length of the first lens unit by the focal length at the wide angle end, that is, the shortest focal length, and defines the appropriate range of the optical power of the first lens unit. When the value of fl/fw does not reach the lower limit of the expression 2, the optical power of the first lens unit is strong. Although this is desirable in the diameter reduction of the front lens and the size reduction, the generation of aberrations increases, in particular, a curvature of the field and distortion are largely generated. To excellently correct them, the addition of a lens element or the addition of an aspherical surface is necessary. This is undesirable in the size reduction and the facilitation of manufacture. Moreover, when the value of fl/fw exceeds the upper limit of the expression 2, although this is advantageous in aberration correction, an increase in the diameter of the front lens and the resultant size increase cannot be avoided, which is undesirable.

By satisfying the following expression 2' instead of the expression 2, a smaller-size and higher-performance taking lens system is obtained:

$$7.0 \leq fl/fw \leq 17.0 \quad (2')$$

Further, in zooming from the wide angle end to the telephoto end, the second lens unit, the third lens unit and the fourth lens unit are moved so that the distance between the first lens unit and the second lens unit increases, the distance between the second lens unit and the third lens unit decreases and the distance between the third lens unit and the fourth lens unit increases.

With the conventional zoom ratio, in many cases, the second lens unit bears most of the zoom ratio and the movement amount of the second lens unit tends to be large. However, to further increase the zoom ratio, an increase in the number of lens elements cannot be avoided in the structure where only the second lens unit bears the zoom ratio, which is undesirable in the size reduction and the facilitation of manufacture. By making each lens unit bear the zoom ratio by moving the first, second, third and fourth lens units, the size reduction and a higher zoom ratio can be achieved without any significant increase in the number of lens elements.

Moreover, only a fifth lens unit situated on the image sensor side of the fourth lens unit is provided in addition to the first to fourth lens units, and the fifth lens unit is stationary in zooming.

Although it is desirable that the light ray incident on the image sensor be substantially vertical to the image sensor, that is, telecentric, when the zoom ratio is increased or the overall size is reduced, it is difficult to ensure telecentricity. The addition of the stationary fifth lens unit makes it easy to ensure telecentricity. Moreover, the presence of the stationary fifth lens unit prevents the intrusion of dust which is a significant problem for the image sensor.

The fifth lens unit includes only one lens element having positive optical power. By the fifth lens unit including only one lens element of positive optical power, an increase in overall length and an increase in cost due to an increase in the number of lens elements can be avoided and excellent telecentricity can be ensured. Moreover, it is further desirable that the fifth lens unit include one plastic lens element, because further reduction in cost and weight can be achieved.

Moreover, the first lens unit at least includes one lens element having negative optical power and one lens element having positive optical power, and the relationships of the following expressions 3 and 4 are satisfied:

$$53 \leq Vdp \quad (3)$$

$$1.58 \leq Ndp \quad (4)$$

where Vdp and Ndp are the Abbe number and the refractive index, to the d-line, of the lens element having positive optical power included in the first lens unit, respectively.

The first lens unit is a unit that is important in deciding the overall length of the taking lens system, significantly influences the correction of chromatic aberration, particularly lateral chromatic aberration, at the telephoto side, and is an element that is high in error sensitivity. The error sensitivity referred to here is the sensitivity of asymmetric image unsharpness which is performance degradation, particularly a shift of the best imaging position along the optical axis at image height positions opposed with respect to the optical axis in the vertical or the horizontal direction when the lens is decentered (shifted parallelly or inclined).

When the value of Vdp does not reach the lower limit of the expression 3, it is difficult to correct aberrations, particularly lateral chromatic aberration at the telephoto end. Moreover, when the value of Ndp does not reach the lower limit of the expression 4, it is necessary to increase the surface curvature to maintain the optical power; consequently, aberrations, particularly a curvature of the field and distortion at the telephoto end are generated and it is difficult to correct them. In addition, an increase in error sensitivity results.

Figure 3:
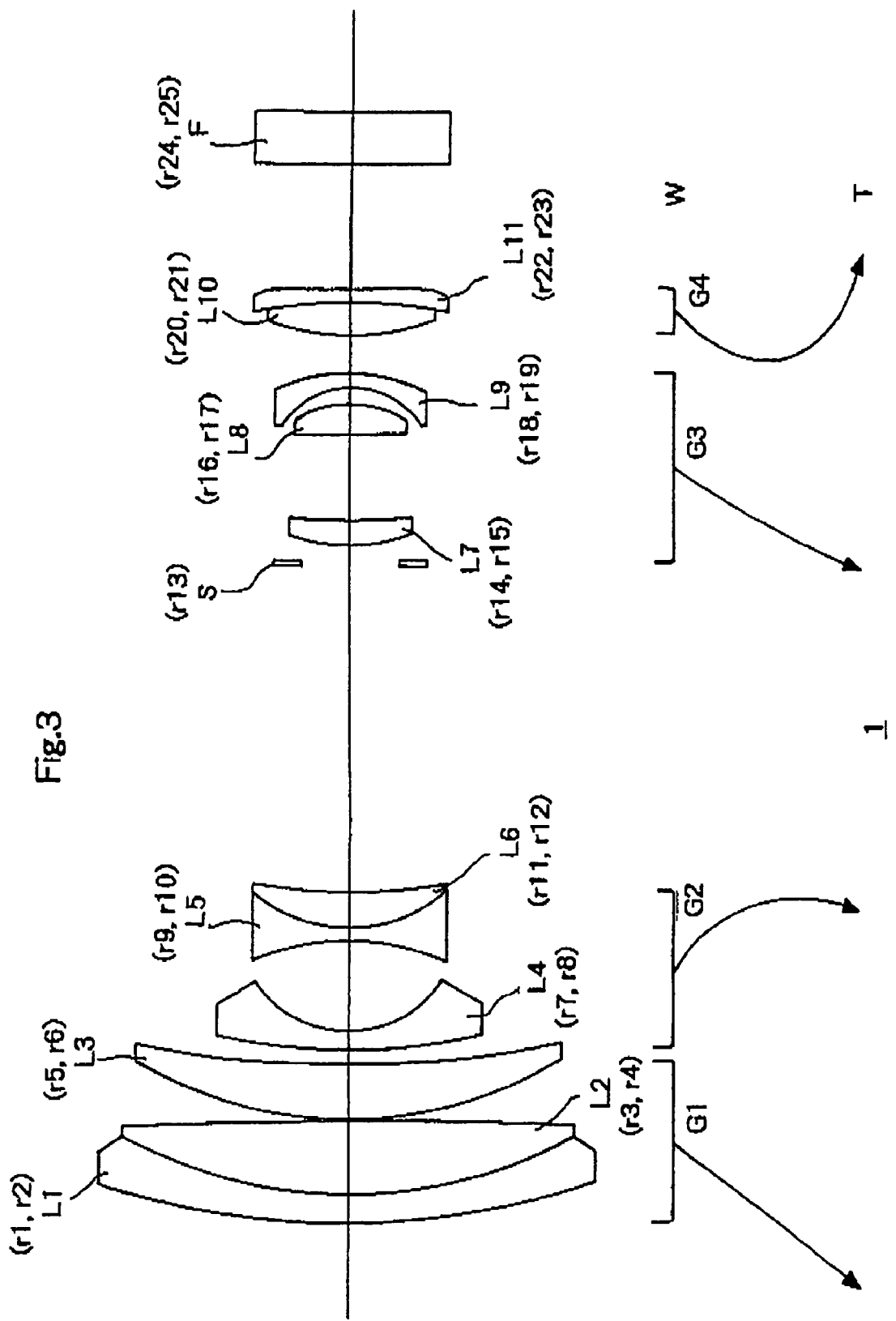
FIG. 3 is a view showing the structure of a taking lens system of a digital camera according to a first embodiment.

FIG. 3 shows the structure of the taking lens system 12 of the first embodiment. The taking lens system 12 comprises, from the side of the object to be photographed, the first lens unit G1, the second lens unit G2, the third lens unit G3 and the fourth lens unit G4.

The first lens unit G1 includes three lens elements L1, L2 and L3, and has positive optical power as a whole. The second lens unit G2 includes three lens elements L4, L5 and L6, and has negative optical power as a whole. The third lens unit G3 includes three lens elements L7, L8 and L9, and has positive optical power as a whole. The fourth lens unit G4 includes two lens elements L10 and L11, and has positive optical power as a whole.

A diaphragm S having a variable aperture is disposed between the second lens unit G2 and the third lens unit G3. The diaphragm S moves together with the third lens unit G3. Moreover, a low pass filter F is disposed immediately in front of the image sensor 21.

Reference designations r1 to r25 shown in FIG. 3 represent the surfaces of the lens elements L1 to L11, the diaphragm S and the filter F. The lens elements L1 to L11 and the filter F each have two surfaces. Of the two surfaces of the same lens element (filter), the one the numerical value of the reference designation of which is lower is the surface closer to the object to be photographed. For example, the lens element L3 has the surfaces r5 and r6, and the surface r5 is situated on the side of the object to be photographed and the surface r6 is situated on the side of the image sensor 21. The diaphragm S has only one surface r13. The medium in front of and behind the surface r13 of the diaphragm S is air, and naturally, the refractive indices in front of and behind the surface r13 are not different.

The surface r14 of the lens element L7, the surface r20 of the lens element L10 and the surface r23 of the lens element L11 are all aspherical surfaces. The lens element L1 and the lens element L2 are cemented together, and an adhesive is present between the surface r2 and the surface r3. The lens element L5 and the lens element L6 are also cemented together, and an adhesive is also present between the surface r10 and the surface r11. Likewise, the lens element L10 and the lens element L11 are cemented together, and an adhesive is present between the surface r21 and the surface r22.

The arrows shown in FIG. 3 indicate the positions of the lens units G1 to G4 in zooming. The base ends of the arrows correspond to the wide angle end, and the tips thereof correspond to the telephoto end. Zooming is performed by moving the first lens unit G1, the second lens unit G2, the third lens unit G3 and the fourth lens unit G4 to thereby change the distances therebetween. In zooming from the wide angle end to the telephoto end, the distance between the first lens unit G1 and the second lens unit G2 increases, the distance between the second lens unit G2 and the third lens unit G3 decreases, and the distance between the third lens unit G3 and the fourth lens unit G4 increases. Moreover, focusing from an infinite object to a near object is performed by moving the fourth lens unit G4 forward.

The focal lengths at the wide angle end and at the telephoto end are 6.00 mm and 93.00 mm, respectively, and consequently, the zoom ratio is 15.5. The f-numbers at the wide angle end and at the telephoto end are 2.88 and 4.48, respectively. Moreover, the f-number when the focal length is the intermediate value 23.63 mm is 3.80.

The construction data of the taking lens system 12 is shown below. In the data shown below, with respect to air, the refractive index and the Abbe number of the medium are omitted. The refractive index and the Abbe number are the ones to the d-line. The unit of distance is mm. Moreover, with respect to the axial distance that changes in zooming, the values at the wide angle end, in the middle focal length condition and at the telephoto end are shown in this order from the left. With respect to each aspherical surface, an asterisk (*) is added to the end of the reference designation.

EXAMPLE 1 f = 6.00-23.63-93.00
FNO. = 2.88-3.80-4.48

| [Radius of Curvature] | [Axial Distance] | [Refractive Index (Nd)] | [Abbe Number (vd)] |
|---|---|---|---|
| r1 = 56.592 | d1 = 2.000 | N1 = 1.84666 | v1 = 23.78 |
| r2 = 34.012 | d2 = 0.010 | N2 = 1.51400 | v2 = 42.83 |
| r3 = 34.012 | d3 = 4.828 | N3 = 1.49700 | v3 = 81.61 |
| r4 = −401.072 | d4 = 0.100 | | |
| r5 = 29.243 | d5 = 3.704 | N4 = 1.71300 | v4 = 53.94 |
| r6 = 79.633 | d6 = 1.000-16.824-28.406 | | |
| r7 = 47.466 | d7 = 1.100 | N5 = 1.88300 | v5 = 40.79 |
| r8 = 7.783 | d8 = 6.027 | | |
| r9 = −19.146 | d9 = 0.900 | N6 = 1.49700 | v6 = 81.61 |
| r10 = 10.715 | d10 = 0.010 | N7 = 1.51400 | v7 = 42.83 |
| r11 = 10.715 | d11 = 2.340 | N8 = 1.84666 | v8 = 23.78 |
| r12 = 35.459 | d12 = 22.148-5.182-1.153 | | |
| r13 = ∞ (S) | d13 = 1.000 | | |
| r14* = 9.256 | d14 = 1.823 | N9 = 1.49700 | v9 = 81.61 |
| r15 = 44.034 | d15 = 5.722 | | |
| r16 = −169.730 | d16 = 2.019 | N10 = 1.49700 | v10 = 81.61 |
| r17 = −6.927 | d17 = 1.069 | | |
| r18 = −6.076 | d18 = 0.900 | N11 = 1.71736 | v11 = 29.50 |
| r19 = −12.756 | d19 = 2.510-4.194-23.349 | | |
| r20* = 15.521 | d20 = 2.131 | N12 = 1.53048 | v12 = 55.72 |
| r21 = −45.628 | d21 = 0.010 | N13 = 1.51400 | v13 = 42.83 |
| r22 = −45.628 | d22 = 0.900 | N14 = 1.62017 | v14 = 24.01 |
| r23* = −1775.757 | d23 = 8.251-14.720-1.000 | | |
| r24 = ∞ | d24 = 3.500 | N15 = 1.51633 | v15 = 64.14 |
| r25 = ∞ | | | |

The aspherical surfaces are defined by the following expression 5:

$$X(H) = C \cdot H^2 / \{1 + (1 - \epsilon \cdot C^2 \cdot H^2)^{1/2}\} \Sigma A k \cdot H^k \quad (5)$$

where H is the height in a direction vertical to the optical axis, X(H) is the amount of displacement in the direction of the optical axis at the height H (with the surface vertex as the reference), C is the paraxial curvature, ε is the quadric surface parameter, k is the degree of the aspherical surface, and Ak is the kth-order aspherical coefficient. The data related to the aspherical surfaces are shown below.

[Aspherical Coefficient]
r14*
  ε=1.0000
  A4=−0.15717526×10$^{-3}$
  A6=−0.19389654×10$^{-5}$
  A8=−0.15573656×10$^{-6}$
  A10=0.69643896×10$^{-8}$
  A12=−0.49551177×10$^{-9}$
r20*
  ε=1.0000
  A4=−0.34607537×10$^{-4}$
  A6=−0.61736587×10$^{-6}$
  A8=0.36334220×10$^{-6}$
  A10=−0.12239069×10$^{-7}$
r23*
  ε=1.0000
  A4=−0.10389724×10$^{-4}$
  A6=−0.29111256×10$^{-5}$
  A8=0.64550962×10$^{-6}$
  A10=−0.27171011×10$^{-7}$
  A12=0.26629674×10$^{-9}$ When the distance from the most object-to-be-photographed side surface r1 of the first lens unit G1 to the imaging surface at the wide angle end is TLw, the overall focal length of the taking lens system 12 at the telephoto end is ft, the overall focal length of the taking lens system 12 at the wide angle end is fw and the focal length of the first lens unit G1 is f1, TLw/ft=0.868 and f1/fw=7.735. Therefore, the relationships of the expressions 1 and 2 are satisfied, and the expressions 1' and 2' are also satisfied.

Moreover, the lens element L3 of the first lens unit G1 is a meniscus lens element having positive optical power, and the Abbe number and the refractive index, to the d-line, of the lens element L3 are 53.94 and 1.713, respectively, as mentioned above. Therefore, the relationships of the expressions 3 and 4 are also satisfied.

Figure 4:
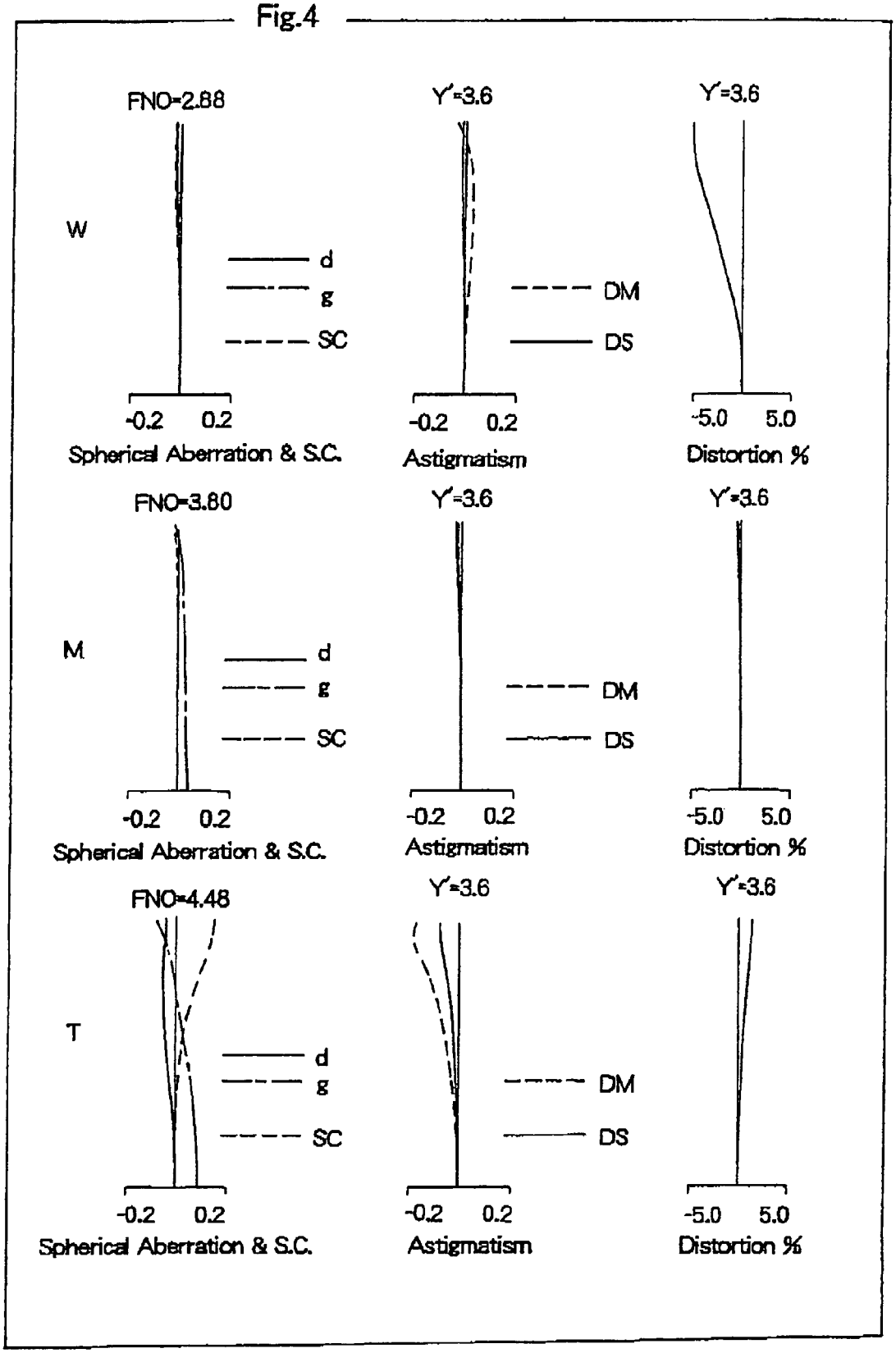
FIG. 4 is a view showing aberrations, at the wide angle end, in the middle focal length condition and at the telephoto end, of the taking lens system of the digital camera according to the first embodiment.

FIG. 4 shows aberrations of the taking lens system 12. Upper group (W) of FIG. 4 show the aberrations at the wide angle end, middle group (M) show the aberrations at the above-mentioned intermediate focal length, and lower group (T) show the aberrations at the telephoto end. The left column show spherical aberration and the unsatisfaction amount of sine condition, the middle column show astigmatism, and right column show distortion. The line d of the spherical aberration represents the aberration to the d-line, and the line g thereof represents the aberration to the g-line. The line SC represents the unsatisfaction amount of sine condition. The line DM and the line DS of the astigmatism represent aberrations on the meridional image plane and on the sagittal image plane, respectively. With respect to the unit, only the unit of the lateral axis of the distortion is percentage, and the units of the other axes are all mm.

Although the zoom ratio of the taking lens system 12 of the digital camera 1 according to the present embodiment is as high as 15.5, as is apparent from FIG. 4, the aberrations are excellently suppressed and high imaging performance is obtained. Moreover, the overall length is only approximately 74 mm (at the wide angle end) even when the filter F is included, and the size is thus small. Further, since the number of lens elements is as small as eleven and the number of aspherical surfaces is as small as three, manufacture is easy.

While the digital cameras of the other embodiments will be described, since the structure other than the taking lens system is similar to that of the first embodiment as mentioned above, overlapping descriptions are omitted, and only the taking lens systems will be described. FIG. 5 through FIG. 12 described below adopt similar notation to that of FIG. 3 and FIG. 4. The definition of the aspherical surfaces conforms to the expression 5, and the construction data adopts similar notation to that of the first embodiment.

Figure 5:
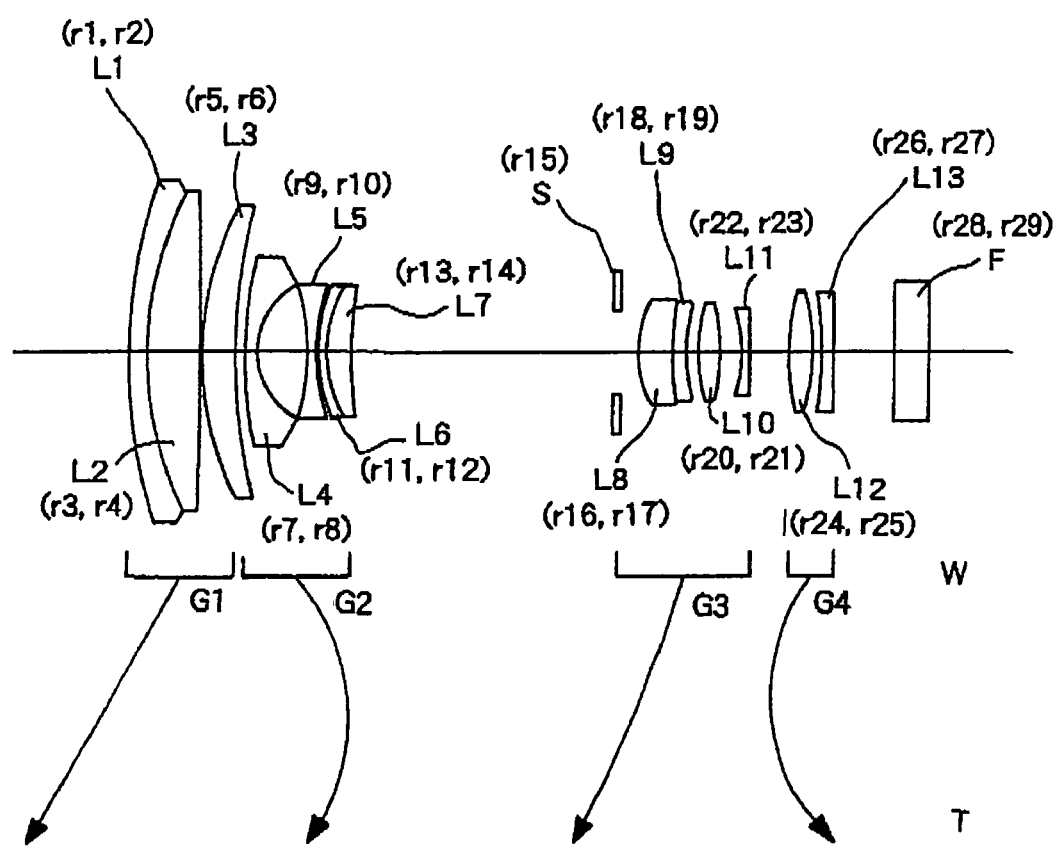
FIG. 5 is a view showing the structure of a taking lens system of a digital camera according to a second embodiment.

FIG. 5 shows the structure of the taking lens system 12 of a digital camera 2 according to a second embodiment. The taking lens system 12 of the digital camera 2 comprises, from the side of the object to be photographed, a first lens unit G1, a second lens unit G2, a third lens unit G3 and a fourth lens unit G4.

The first lens unit G1 includes three lens elements L1, L2 and L3, and has positive optical power as a whole. The second lens unit G2 includes four lens elements L4, L5, L6 and L7, and has negative optical power as a whole. The third lens unit G3 includes four lens elements L8, L9, L10 and L11, and has positive optical power as a whole. The fourth lens unit G4 includes two lens elements L12 and L13, and has positive optical power as a whole.

A diaphragm S is disposed between the second lens unit G2 and the third lens unit G3. The diaphragm S moves together with the third lens unit G3. Moreover, a low pass filter F is disposed immediately in front of the image sensor 21.

In the present embodiment, the taking lens system 12 has surfaces r1 to r29 from the side of the object to be photographed. The surface r16 of the lens element L8, the surfaces r22 and r23 of the lens element L11, the surface r24 of the lens element L12 and the surface r27 of the lens element L13 are all aspherical surfaces. Moreover, the lens element L1 and the lens element L2, the lens element L6 and the lens element L7, and the lens element L8 and the lens element L9 are cemented together, and an adhesive is present between the surface r2 and the surface r3, between the surface r12 and the surface r13, and between the surface r17 and the surface r18.

Zooming is performed by moving the first lens unit G1, the second lens unit G2, the third lens unit G3 and the fourth lens unit G4. In zooming from the wide angle end to the telephoto end, the distance between the first lens unit G1 and the second lens unit G2 increases, the distance between the second lens unit G2 and the third lens unit G3 decreases, and the distance between the third lens unit G3 and the fourth lens unit G4 increases. Moreover, focusing from an infinite object to a near object is performed by moving the fourth lens unit G4 forward.

The focal lengths at the wide angle end and at the telephoto end are 6.00 mm and 105.04 mm, respectively, and consequently, the zoom ratio is 17.5. The f-numbers at the wide angle end and at the telephoto end are 2.88 and 4.60, respectively. Moreover, the f-number when the focal length is the intermediate value 25.11 mm is 4.00.

The construction data and the data related to the aspherical surfaces of the taking lens system 12 are shown below.

EXAMPLE 2 f = 6.00-25.11-105.04
FNO. = 2.88-4.00-4.60

| [Radius of Curvature] | [Axial Distance] | [Refractive Index (Nd)] | [Abbe Number (νd)] |
|---|---|---|---|
| r1 = 49.685 | d1 = 2.000 | N1 = 1.84666 | ν1 = 23.78 |
| r2 = 35.011 | d2 = 0.010 | N2 = 1.51400 | ν2 = 42.83 |
| r3 = 35.011 | d3 = 5.308 | N3 = 1.49700 | ν3 = 81.61 |
| r4 = −388.072 | d4 = 0.100 | | |
| r5 = 30.466 | d5 = 3.320 | N4 = 1.58913 | ν4 = 61.25 |
| r6 = 56.921 | d6 = 1.000-20.170-34.480 | | |
| r7 = 42.517 | d7 = 1.100 | N5 = 1.77250 | ν5 = 49.77 |
| r8 = 7.334 | d8 = 5.180 | | |
| r9 = −23.235 | d9 = 0.900 | N6 = 1.62041 | ν6 = 60.34 |
| r10 = 21.058 | d10 = 0.100 | | |
| r11 = 15.374 | d11 = 0.900 | N7 = 1.49700 | ν7 = 81.61 |
| r12 = 12.149 | d12 = 0.010 | N8 = 1.51400 | ν8 = 42.83 |
| r13 = 12.149 | d13 = 2.449 | N9 = 1.84666 | ν9 = 23.78 |
| r14 = 37.074 | d14 = 25.891-6.159-1.199 | | |
| r15 = ∞ (S) | d15 = 1.885 | | |
| r16* = 8.377 | d16 = 3.477 | N10 = 1.58913 | ν10 = 61.25 |
| r17 = 25.473 | d17 = 0.010 | N11 = 1.51400 | ν11 = 42.83 |
| r18 = 25.473 | d18 = 1.099 | N12 = 1.80518 | ν12 = 25.46 |
| r19 = 11.220 | d19 = 1.345 | | |
| r20 = 13.080 | d20 = 2.385 | N13 = 1.49700 | ν13 = 81.61 |
| r21 = −15.864 | d21 = 2.000 | | |
| r22* = −13.119 | d22 = 0.900 | N14 = 1.53048 | ν14 = 55.72 |
| r23* = −61.436 | d23 = 3.825-4.667-29.891 | | |
| r24* = 20.056 | d24 = 2.405 | N15 = 1.53048 | ν15 = 55.72 |
| r25 = −23.047 | d25 = 0.822 | | |
| r26 = −36.355 | d26 = 1.200 | N16 = 1.62017 | ν16 = 24.01 |
| r27* = 168.449 | d27 = 5.879-14.027-1.027 | | |
| r28 = ∞ | d28 = 3.500 | N17 = 1.51633 | ν17 = 64.14 |
| r29 = ∞ | | | |

[Aspherical Coefficient]
r16*
 $\epsilon = 1.0000$
 $A4 = -0.10457627 \times 10^{-3}$
 $A6 = -0.25718709 \times 10^{-5}$
 $A8 = 0.80606108 \times 10^{-7}$ A10=−0.31060261×10$^{-8}$
A12=0.25575354×10$^{-10}$
r22*
ε=1.0000
A4=0.17458504×10$^{-4}$
A6=0.27706170×10$^{-5}$
A8=0.11939172×10$^{-6}$
A10=0.21933088×10$^{-9}$
A12=0.36122704×10$^{-20}$
r23*
ε=1.0000
A4=0.28908983×10$^{-3}$
A6=0.40707937×10$^{-5}$
A8=0.22238220×10$^{-6}$
r24*
ε=1.0000
A4=−0.65876933×10$^{-4}$
A6=−0.25524857×10$^{-5}$
A8=0.11859307×10$^{-6}$
A10=−0.24928421×10$^{-8}$
r27*
ε=1.0000
A4=−0.53633713×10$^{-4}$
A6=−0.26306127×10$^{-5}$
A8=0.88272987×10$^{-7}$
A10=−0.17704644×10$^{-8}$ When the distance from the most object-to-be-photographed side surface r1 of the first lens unit G1 to the imaging surface at the wide angle end is TLw, the overall focal length of the taking lens system 12 at the telephoto end is ft, the overall focal length of the taking lens system 12 at the wide angle end is fw and the focal length of the first lens unit G1 is f1, TLw/ft=0.816 and f1/fw=9.455. Therefore, the relationships of the expressions 1 and 2 are satisfied, and the expressions 1' and 2' are also satisfied.

Moreover, the lens element L3 of the first lens unit G1 is a meniscus lens element having positive optical power, and the Abbe number and the refractive index, to the d-line, of the lens element L3 are 61.25 and 1.589, respectively, as mentioned above. Therefore, the relationships of the expressions 3 and 4 are also satisfied.

Figure 6:
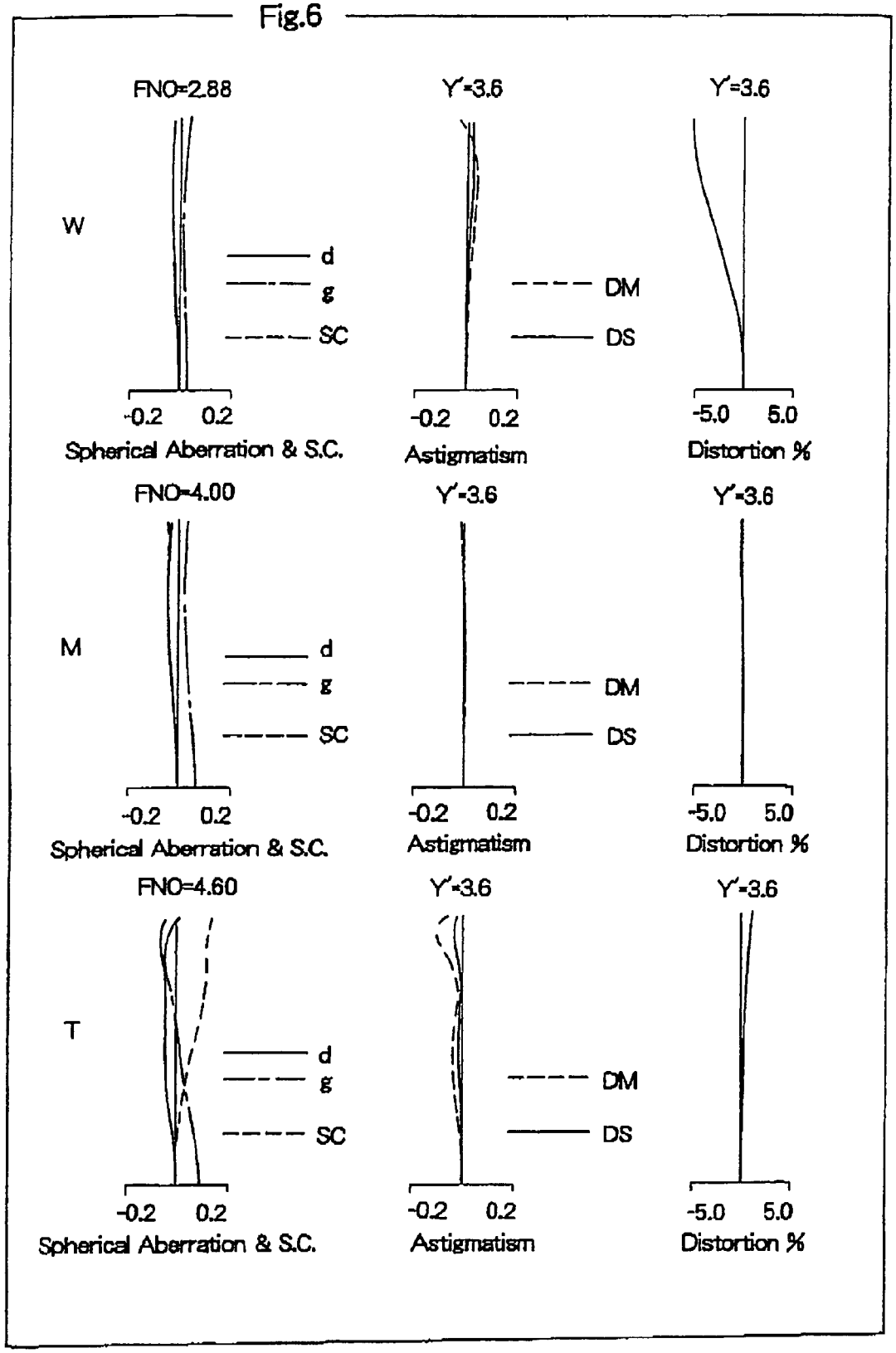
FIG. 6 is a view showing aberrations, at the wide angle end, in the middle focal length condition and at the telephoto end, of the taking lens system of the digital camera according to the second embodiment.

FIG. 6 shows aberrations of the taking lens system 12. Although the zoom ratio of the taking lens system 12 of the digital camera 2 according to the present embodiment is as high as 17.5, as is apparent from FIG. 6, the aberrations are excellently suppressed and high imaging performance is obtained. Moreover, the overall length is only approximately 79 mm (at the wide angle end) even when the filter F is included, and the size is thus small. Further, since the number of lens elements is as small as thirteen and the number of aspherical surfaces is as small as five, manufacture is easy.

Figure 7:
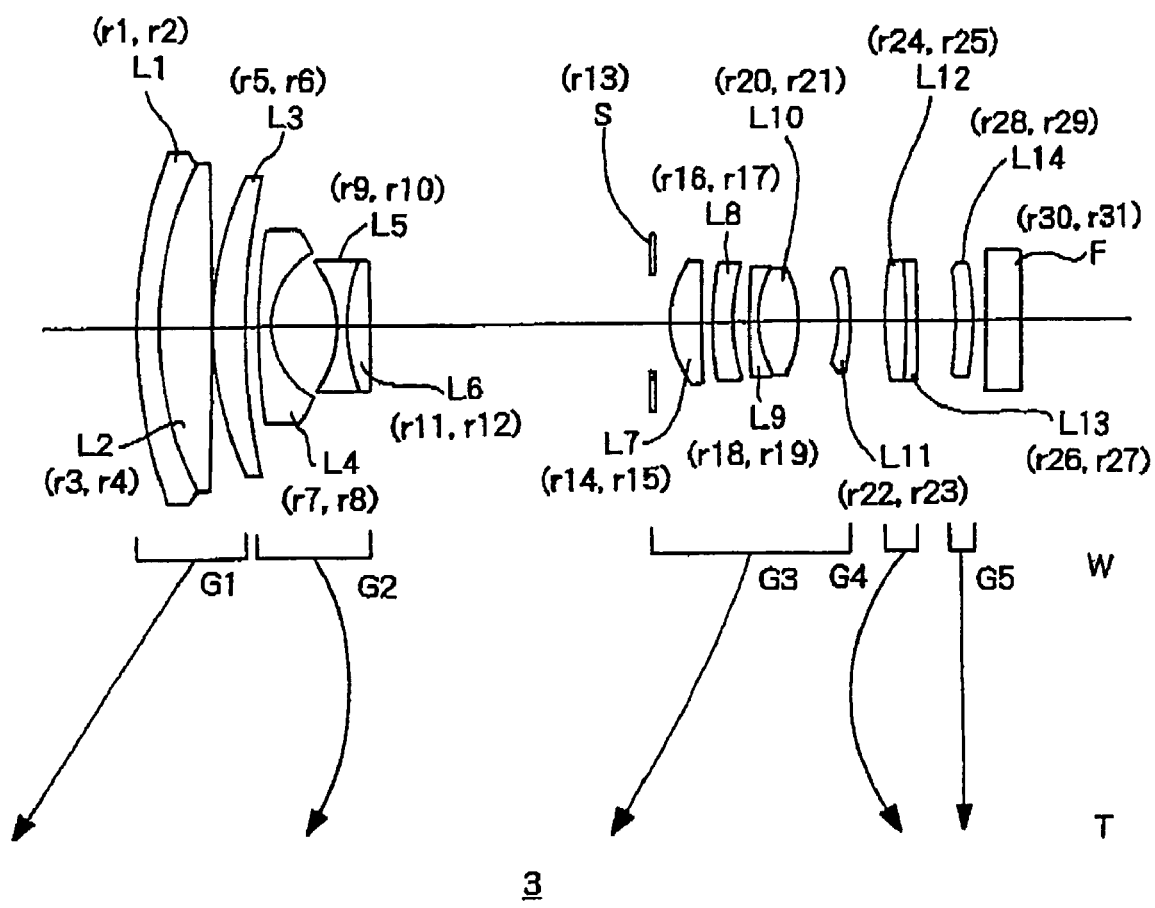
FIG. 7 is a view showing the structure of a taking lens system of a digital camera according to a third embodiment.

FIG. 7 shows the structure of the taking lens system 12 of a digital camera 3 according to a third embodiment. The taking lens system 12 of the digital camera 3 comprises, from the side of the object to be photographed, a first lens unit G1, a second lens unit G2, a third lens unit G3, a fourth lens unit G4 and a fifth lens unit G5.

The first lens unit G1 includes three lens elements L1, L2 and L3, and has positive optical power as a whole. The second lens unit G2 includes three lens elements L4, L5 and L6, and has negative optical power as a whole. The third lens unit G3 includes five lens elements L7, L8, L9, L10 and L11, and has positive optical power as a whole. The fourth lens unit G4 includes two lens elements L12 and L13, and has positive optical power as a whole. The fifth lens unit G5 includes a single lens element L14, and has positive optical power.

A diaphragm S is disposed between the second lens unit G2 and the third lens unit G3. The diaphragm S moves together with the third lens unit G3. Moreover, a low pass filter F is disposed immediately in front of the image sensor 21.

In the present embodiment, the taking lens system 12 has surfaces r1 to r31 from the side of the object to be photographed. The surface r7 of the lens element L4, the surface r16 of the lens element L8, the surfaces r22 and r23 of the lens element L11 and the surfaces r28 and r29 of the lens element L14 are all aspherical surfaces. Moreover, the lens element L1 and the lens element L2, the lens element L5 and the lens element L6, the lens element L9 and the lens element L10 and the lens element L12 and the lens element L13 are cemented together, and an adhesive is present between the surface r2 and the surface r3, between the surface r10 and the surface r11, between the surface r19 and the surface r20 and between the surface r25 and the surface r26.

The fifth lens unit G5 is stationary, and zooming is performed by moving the first lens unit G1, the second lens unit G2, the third lens unit G3 and the fourth lens unit G4. In zooming from the wide angle end to the telephoto end, the distance between the first lens unit G1 and the second lens unit G2 increases, the distance between the second lens unit G2 and the third lens unit G3 decreases, and the distance between the third lens unit G3 and the fourth lens unit G4 increases. Moreover, focusing from an infinite object to a near object is performed by moving the fourth lens unit G4 forward.

The focal lengths at the wide angle end and at the telephoto end are 6.01 mm and 104.90 mm, respectively, and consequently, the zoom ratio is 17.5. The f-numbers at the wide angle end and at the telephoto end are 2.88 and 4.60, respectively. Moreover, the f-number when the focal length is the intermediate value 25.16 mm is 4.00

The construction data and the data related to the aspherical surfaces of the taking lens system 12 are shown below.

EXAMPLE 3 f = 6.01-25.16-104.90
FNO. = 2.88-4.00-4.60

| [Radius of Curvature] | [Axial Distance] | [Refractive Index (Nd)] | [Abbe Number (νd)] |
|---|---|---|---|
| r1 = 49.495 | d1 = 2.000 | N1 = 1.84666 | ν1 = 23.78 |
| r2 = 34.901 | d2 = 0.010 | N2 = 1.51400 | ν2 = 42.83 |
| r3 = 34.901 | d3 = 5.203 | N3 = 1.49700 | ν3 = 81.61 |
| r4 = −691.228 | d4 = 0.100 | | |
| r5 = 33.472 | d5 = 3.169 | N4 = 1.60300 | ν4 = 65.44 |
| r6 = 69.607 | d6 = 1.000-21.172-34.557 | | |

-continued $$f = 6.01\text{-}25.16\text{-}104.90$$
$$FNO. = 2.88\text{-}4.00\text{-}4.60$$

| [Radius of Curvature] | [Axial Distance] | [Refractive Index (Nd)] | [Abbe Number (νd)] |
|---|---|---|---|
| r7* = 53.264 | d7 = 1.100 | N5 = 1.77250 | ν5 = 49.77 |
| r8 = 7.836 | d8 = 6.376 | | |
| r9 = −10.227 | d9 = 1.000 | N6 = 1.48749 | ν6 = 70.44 |
| r10 = 16.597 | d10 = 0.010 | N7 = 1.51400 | ν7 = 42.83 |
| r11 = 16.597 | d11 = 2.192 | N8 = 1.84666 | ν8 = 23.78 |
| r12 = 586.276 | d12 = 26.823-8.838-1.516 | | |
| r13 = ∞ (S) | d13 = 1.800 | | |
| r14 = 9.949 | d14 = 3.154 | N9 = 1.48749 | ν9 = 70.44 |
| r15 = 244.380 | d15 = 0.898 | | |
| r16* = 18.859 | d16 = 1.972 | N10 = 1.77250 | ν10 = 49.77 |
| r17 = 18.032 | d17 = 1.551 | | |
| r18 = 38.097 | d18 = 0.900 | N11 = 1.80610 | ν11 = 33.27 |
| r19 = 10.000 | d19 = 0.010 | N12 = 1.51400 | ν12 = 42.83 |
| r20 = 10.000 | d20 = 3.800 | N13 = 1.49700 | ν13 = 81.61 |
| r21 = −12.822 | d21 = 3.653 | | |
| r22* = −10.755 | d22 = 1.200 | N14 = 1.53048 | ν14 = 55.72 |
| r23* = −21.337 | d23 = 3.167-4.928-29.279 | | |
| r24 = 29.771 | d24 = 2.065 | N15 = 1.58144 | ν15 = 40.89 |
| r25 = −50.210 | d25 = 0.010 | N16 = 1.51400 | ν16 = 42.83 |
| r26 = −50.210 | d26 = 0.980 | N17 = 1.84666 | ν17 = 23.78 |
| r27 = −303.034 | d27 = 3.590-13.202-4.227 | | |
| r28* = −25.643 | d28 = 1.768 | N18 = 1.53048 | ν18 = 55.72 |
| r29* = −15.450 | d29 = 1.000 | | |
| r30 = ∞ | d30 = 3.500 | N19 = 1.51633 | ν19 = 64.14 |
| r31 = ∞ | | | |

[Aspherical Coefficient]
r7*
  $\epsilon = 1.0000$
  $A4 = 0.47682540 \times 10^{-4}$
  $A6 = 0.47422721 \times 10^{-7}$
  $A8 = -0.14909735 \times 10^{-7}$
  $A10 = 0.26284016 \times 10^{-9}$
  $A12 = -0.16274244 \times 10^{-11}$
r16*
  $\epsilon = 1.0000$
  $A4 = -0.14609364 \times 10^{-3}$
  $A6 = -0.65176040 \times 10^{-6}$
  $A8 = -0.26701526 \times 10^{-7}$
  $A10 = 0.68837483 \times 10^{-9}$
  $A12 = -0.67312545 \times 10^{-11}$
r22*
  $\epsilon = 1.0000$
  $A4 = -0.84819509 \times 10^{-4}$
  $A6 = 0.70461219 \times 10^{-5}$
  $A8 = -0.28021729 \times 10^{-6}$
r23*
  $\epsilon = 1.0000$
  $A4 = -0.10834851 \times 10^{-3}$
  $A6 = 0.79727593 \times 10^{-5}$
  $A8 = -0.41135391 \times 10^{-6}$
  $A10 = 0.59542428 \times 10^{-8}$
  $A12 = -0.15958390 \times 10^{-10}$
r28*
  $\epsilon = 1.0000$
  $A4 = 0.57113952 \times 10^{-3}$
  $A6 = -0.16328764 \times 10^{-5}$
  $A8 = -0.21069336 \times 10^{-5}$
  $A10 = 0.73337090 \times 10^{-7}$
r29*
  $\epsilon = 1.0000$
  $A4 = 0.90842475 \times 10^{-3}$
  $A6 = 0.16579325 \times 10^{-4}$
  $A8 = -0.43688361 \times 10^{-5}$
  $A10 = 0.13256343 \times 10^{-6}$ When the distance from the most object-to-be-photographed side surface r1 of the first lens unit G1 to the imaging surface at the wide angle end is TLw, the overall focal length of the taking lens system 12 at the telephoto end is ft, the overall focal length of the taking lens system 12 at the wide angle end is fw and the focal length of the first lens unit G1 is f1, TLw/ft=0.865 and f1/fw=9.610. Therefore, the relationships of the expressions 1 and 2 are satisfied, and the expressions 1' and 2' are also satisfied.

Figure 8:
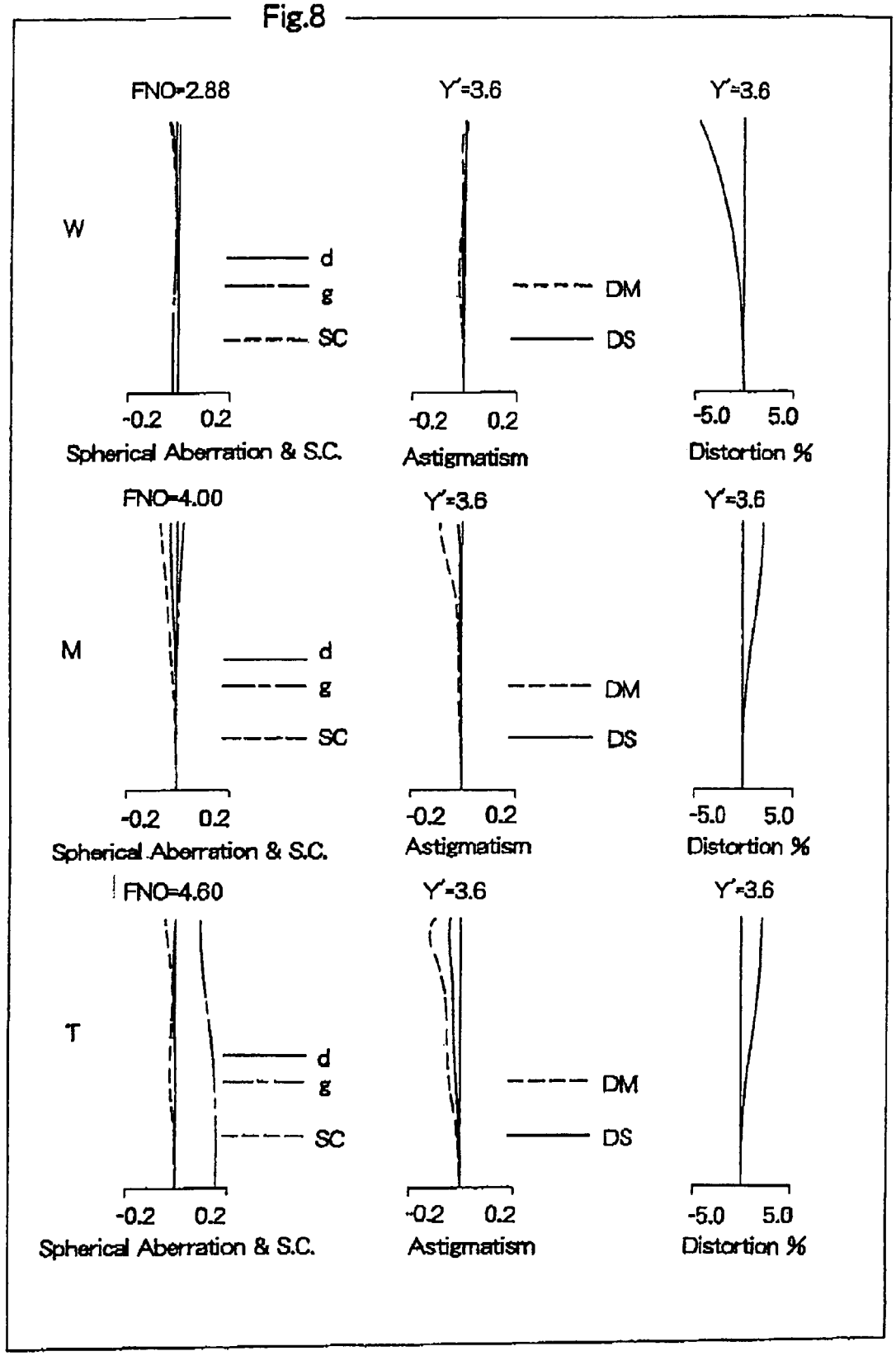
FIG. 8 is a view showing aberrations, at the wide angle end, in the middle focal length condition and at the telephoto end, of the taking lens system of the digital camera according to the third embodiment.

Moreover, the lens element L3 of the first lens unit G1 is a meniscus lens element having positive optical power, and the Abbe number and the refractive index, to the d-line, of the lens element L3 are 65.44 and 1.603, respectively, as mentioned above. Therefore, the relationships of the expressions 3 and 4 are also satisfied FIG. 8 show aberrations of the taking lens system 12. Although the zoom ratio of the taking lens system 12 of the digital camera 3 according to the present embodiment is as high as 17.5, as is apparent from FIG. 8, the aberrations are excellently suppressed and high imaging performance is obtained. Moreover, the overall length is only approximately 84 mm (at the wide angle end) even when the filter F is included, and the size is thus small. Further, since the number of lens elements is as small as fourteen and the number of aspherical surfaces is as small as six, manufacture is easy.

Figure 9:
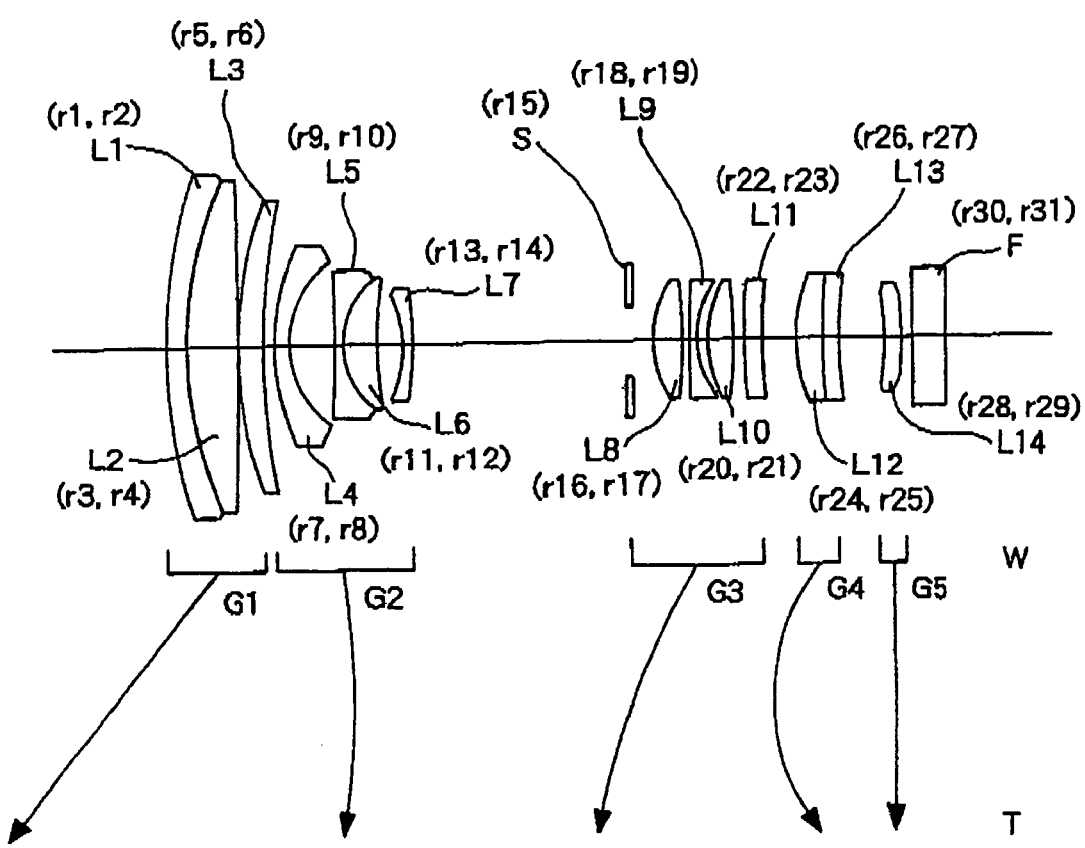
FIG. 9 is a view showing the structure of a taking lens system of a digital camera according to a fourth embodiment.

FIG. 9 shows the structure of the taking lens system 12 of a digital camera 4 according to a fourth embodiment. The taking lens system 12 of the digital camera 4 comprises, from the side of the object to be photographed, a first lens unit G1, a second lens unit G2, a third lens unit G3, a fourth lens unit G4 and a fifth lens unit G5.

The first lens unit G1 includes three lens elements L1, L2 and L3, and has positive optical power as a whole. The second lens unit G2 includes four lens elements L4, L5, L6 and L7, and has negative optical power as a whole. The third lens unit G3 includes four lens elements L8, L9, L10 and L11, and has positive optical power as a whole. The fourth lens unit G4 includes two lens elements L12 and L13, and has positive optical power as a whole. The fifth lens unit G5 includes a single lens element L14, and has positive optical power.

A diaphragm S is disposed between the second lens unit G2 and the third lens unit G3. The diaphragm S moves together with the third lens unit G3. Moreover, a low pass filter F is disposed immediately in front of the image sensor 21.

In the present embodiment, the taking lens system 12 has surfaces r1 to r31 from the side of the object to be photographed. The surface r16 of the lens element L8, the surfaces r22 and r23 of the lens element L11 and the surfaces r28 and r29 of the lens element L14 are all aspherical surfaces. Moreover, the lens element L1 and the lens element L2, the lens element L5 and the lens element L6 and the lens element L12 and the lens element L13 are cemented together, and an adhesive is present between the surface r2 and the surface r3, between the surface r10 and the surface r11 and between the surface r25 and the surface r26.

The fifth lens unit G5 is stationary, and zooming is performed by moving the first lens unit G1, the second lens unit G2, the third lens unit G3 and the fourth lens unit G4. In zooming from the wide angle end to the telephoto end, the distance between the first lens unit G1 and the second lens unit G2 increases, the distance between the second lens unit G2 and the third lens unit G3 decreases, and the distance between the third lens unit G3 and the fourth lens unit G4 increases. Moreover, focusing from an infinite object to a near object is performed by moving the fourth lens unit G4 forward.

The focal lengths at the wide angle end and at the telephoto end are 6.01 mm and 104.91 mm, respectively, and consequently, the zoom ratio is 17.5. The f-numbers at the wide angle end and at the telephoto end are 2.88 and 4.60, respectively. Moreover, the f-number when the focal length is the intermediate value 25.11 mm is 4.00

The construction data and the data related to the aspherical surfaces of the taking lens system 12 are shown below.

EXAMPLE 4 f = 6.01-25.11-104.91
FNO. = 2.88-4.00-4.60

| [Radius of Curvature] | [Axial Distance] | [Refractive Index (Nd)] | [Abbe Number (νd)] |
|---|---|---|---|
| r1 = 50.953 | d1 = 1.800 | N1 = 1.84666 | ν1 = 23.78 |
| r2 = 36.545 | d2 = 0.010 | N2 = 1.51400 | ν2 = 42.83 |
| r3 = 36.545 | d3 = 5.184 | N3 = 1.49700 | ν3 = 81.61 |
| r4 = −421.145 | d4 = 0.100 | | |
| r5 = 42.190 | d5 = 2.525 | N4 = 1.62041 | ν4 = 60.34 |
| r6 = 74.796 | d6 = 1.000-22.821-42.652 | | |
| r7 = 23.801 | d7 = 1.100 | N5 = 1.88300 | ν5 = 40.79 |
| r8 = 9.396 | d8 = 4.963 | | |
| r9 = −148.533 | d9 = 0.800 | N6 = 1.67003 | ν6 = 47.20 |
| r10 = 7.727 | d10 = 0.010 | N7 = 1.51400 | ν7 = 42.83 |
| r11 = 7.727 | d11 = 3.384 | N8 = 1.84666 | ν8 = 23.78 |
| r12 = 46.614 | d12 = 2.508 | | |
| r13 = −10.799 | d13 = 0.800 | N9 = 1.72916 | ν9 = 54.67 |
| r14 = −50.197 | d14 = 20.922-6.389-1.500 | | |
| r15 = ∞ (S) | d15 = 2.000 | | |
| r16* = 8.393 | d16 = 3.256 | N10 = 1.58913 | ν10 = 61.25 |
| r17 = −47.186 | d17 = 0.600 | | |
| r18 = 89.880 | d18 = 0.800 | N11 = 1.80610 | ν11 = 33.27 |
| r19 = 9.296 | d19 = 1.098 | | |
| r20 = 11.264 | d20 = 2.646 | N12 = 1.49700 | ν12 = 81.61 |
| r21 = −37.064 | d21 = 1.075 | | |
| r22* = 253.863 | d22 = 1.621 | N13 = 1.53048 | ν13 = 55.72 |
| r23* = 221.963 | d23 = 3.691-6.824-23.722 | | |
| r24 = 18.159 | d24 = 2.508 | N14 = 1.49700 | ν14 = 81.61 |
| r25 = 62.579 | d25 = 0.010 | N15 = 1.51400 | ν15 = 42.83 |
| r26 = 62.579 | d26 = 1.491 | N16 = 1.67003 | ν16 = 47.20 |
| r27 = 44.935 | d27 = 4.450-13.848-4.551 | | |
| r28* = −19.088 | d28 = 1.787 | N17 = 1.53048 | ν17 = 55.72 |
| r29* = −14.198 | d29 = 1.000-1.000-1.000 | | |
| r30 = ∞ | d30 = 3.500 | N18 = 1.51633 | ν18 = 64.14 |
| r31 = ∞ | | | |

[Aspherical Coefficient]
r16*
$\epsilon = 1.0000$
$A4 = -0.15086371 \times 10^{-3}$
$A6 = -0.43013186 \times 10^{-5}$
$A8 = 0.24186975 \times 10^{-6}$
$A10 = -0.10426824 \times 10^{-7}$
$A12 = 0.15727119 \times 10^{-9}$
r22*
$\epsilon = 1.0000$
$A4 = -0.23382801 \times 10^{-4}$
$A6 = 0.44151149 \times 10^{-5}$
$A8 = -0.98965393 \times 10^{-7}$
r23*
$\epsilon = 1.0000$
$A4 = 0.18416651 \times 10^{-3}$
$A6 = 0.55132901 \times 10^{-5}$
$A8 = -0.68891492 \times 10^{-7}$
$A10 = 0.45219416 \times 10^{-10}$ r28*
    $\epsilon=1.0000$
    $A4=0.10093154\times10^{-2}$
    $A6=-0.35553820\times10^{-4}$
    $A8=0.12710906\times10^{-5}$
    $A10=-0.58154686\times10^{-7}$
r29*
    $\epsilon=1.0000$
    $A4=0.14841642\times10^{-2}$
    $A6=-0.43512515\times10^{-4}$
    $A8=0.11033650\times10^{-5}$
    $A10=-0.55064467\times10^{-7}$ When the distance from the most object-to-be-photographed side surface r1 of the first lens unit G1 to the imaging surface at the wide angle end is TLw, the overall focal length of the taking lens system 12 at the telephoto end is ft, the overall focal length of the taking lens system 12 at the wide angle end is fw and the focal length of the first lens unit G1 is f1, TLw/ft=0.794 and f1/fw=11.282. Therefore, the relationships of the expressions 1 and 2 are satisfied, and the expressions 1' and 2' are also satisfied.

Figure 10:
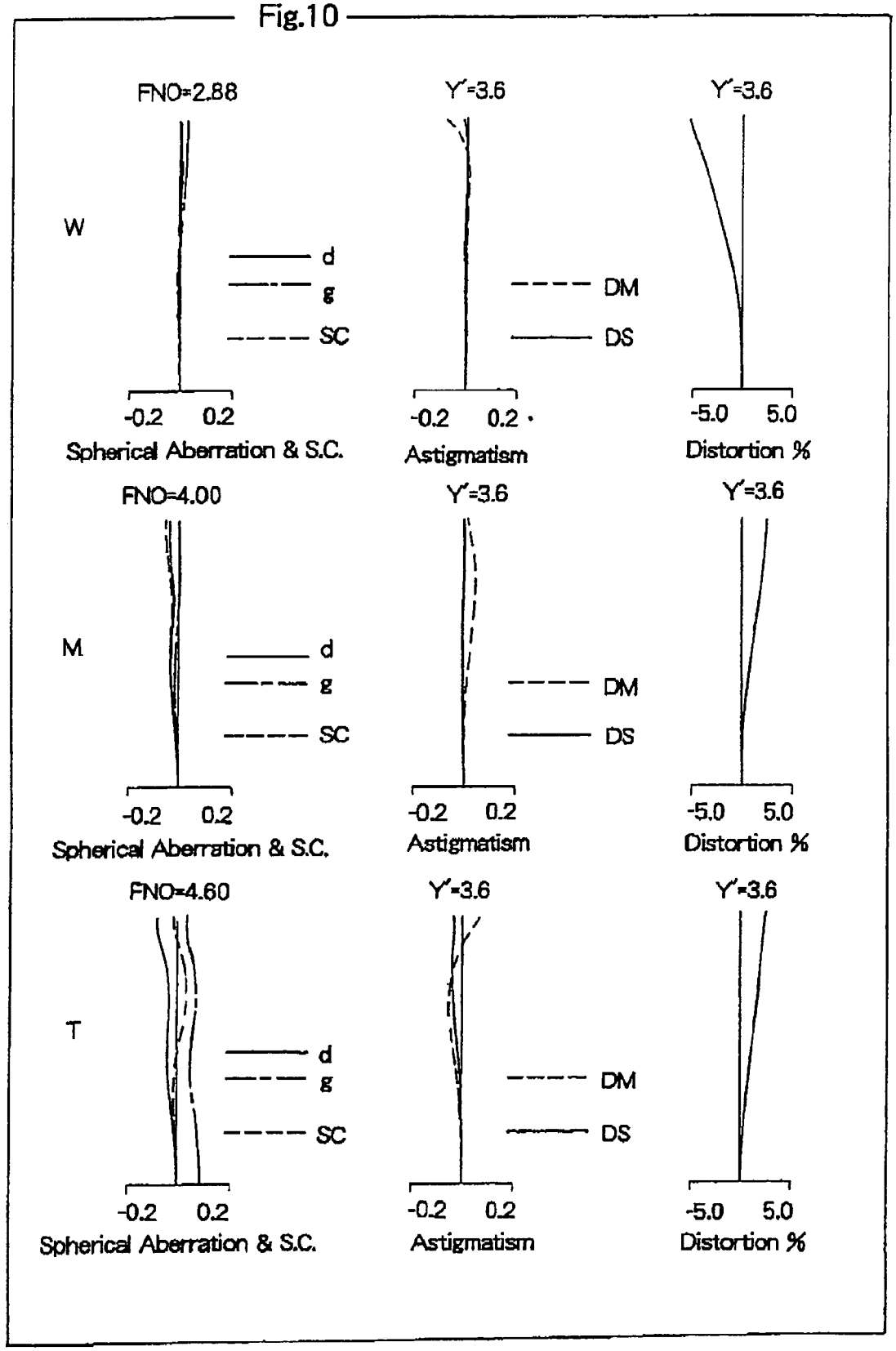
FIG. 10 is a view showing aberrations, at the wide angle end, in the middle focal length condition and at the telephoto end, of the taking lens system of the digital camera according to the fourth embodiment.

Moreover, the lens element L3 of the first lens unit G1 is a meniscus lens element having positive optical power, and the Abbe number and the refractive index, to the d-line, of the lens element L3 are 60.34 and 1.620, respectively, as mentioned above. Therefore, the relationships of the expressions 3 and 4 are also satisfied FIG. 10 show aberrations of the taking lens system 12. Although the zoom ratio of the taking lens system 12 of the digital camera 4 according to the present embodiment is as high as 17.5, as is apparent from FIG. 10, the aberrations are excellently suppressed and high imaging performance is obtained. Moreover, the overall length is only approximately 77 mm (at the wide angle end) even when the filter F is included, and the size is thus small. Further, since the number of lens elements is as small as fourteen and the number of aspherical surfaces is as small as five, manufacture is easy.

Figure 11:
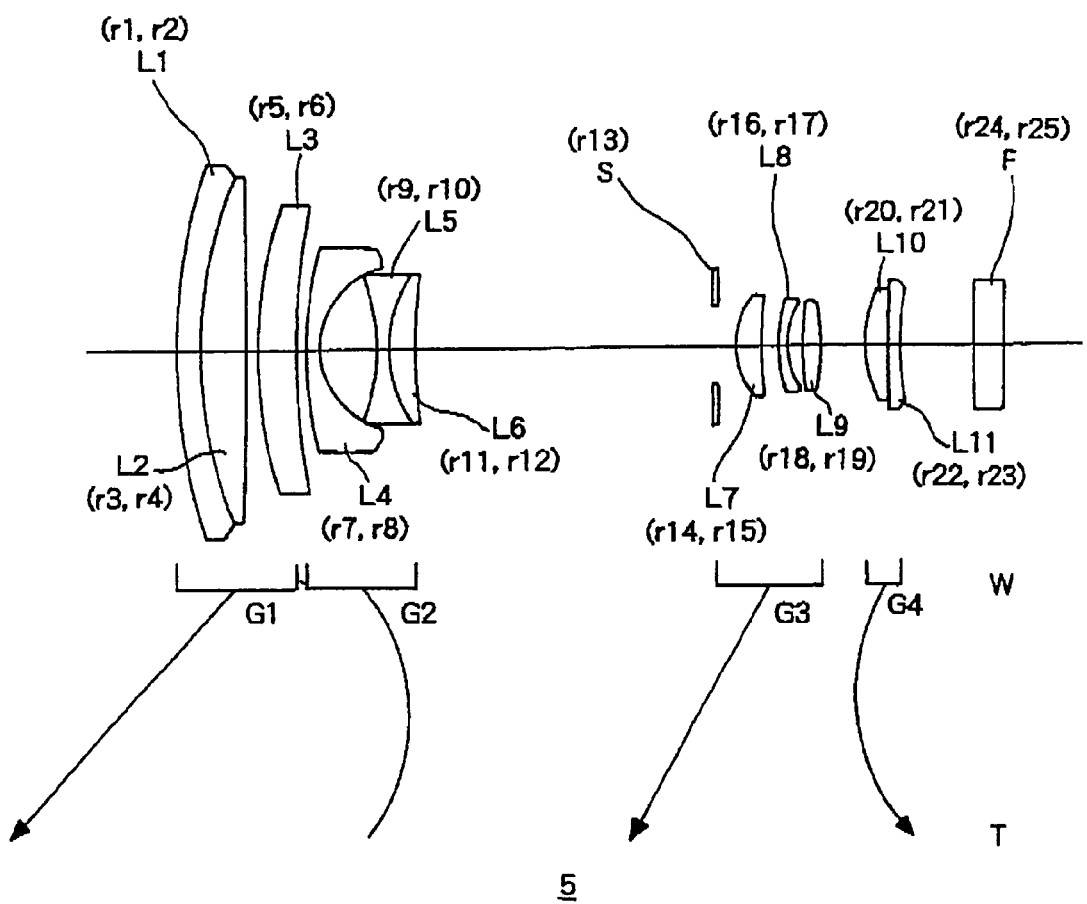
FIG. 11 is a view showing the structure of a taking lens system of a digital camera according to a fifth embodiment.

FIG. 11 shows the structure of the taking lens system 12 of a digital camera 5 according to a fifth embodiment. The taking lens system 12 of the digital camera 5 comprises, from the side of the object to be photographed, a first lens unit G1, a second lens unit G2, a third lens unit G3 and a fourth lens unit G4.

The first lens unit G1 includes three lens elements L1, L2 and L3, and has positive optical power as a whole. The second lens unit G2 includes three lens elements L4, L5 and L6, and has negative optical power as a whole. The third lens unit G3 includes three lens elements L7, L8 and L9, and has positive optical power as a whole. The fourth lens unit G4 includes two lens elements L11 and L12, and has positive optical power as a whole.

A diaphragm S is disposed between the second lens unit G2 and the third lens unit G3. The diaphragm S moves together with the third lens unit G3. Moreover, a low pass filter F is disposed immediately in front of the image sensor 21.

In the present embodiment, the taking lens system 12 has surfaces r1 to r25 from the side of the object to be photographed. The surface r14 of the lens element L7, the surface r20 of the lens element L10 and the surface r23 of the lens element L11 are all aspherical surfaces. Moreover, the lens element L1 and the lens element L2, the lens element L5 and the lens element L6, and the lens element L10 and the lens element L11 are cemented together, and an adhesive is present between the surface r2 and the surface r3, between the surface r10 and the surface r11, and between the surface r21 and the surface r22.

Zooming is performed by moving the first lens unit G1, the second lens unit G2, the third lens unit G3 and the fourth lens unit G4. In zooming from the wide angle end to the telephoto end, the distance between the first lens unit G1 and the second lens unit G2 increases, the distance between the second lens unit G2 and the third lens unit G3 decreases, and the distance between the third lens unit G3 and the fourth lens unit G4 increases. Moreover, focusing from an infinite object to a near object is performed by moving the fourth lens unit G4 forward.

The focal lengths at the wide angle end and at the telephoto end are 6.00 mm and 117.00 mm, respectively, and consequently, the zoom ratio is 19.5. The f-numbers at the wide angle end and at the telephoto end are 2.88 and 4.90, respectively. Moreover, the f-number when the focal length is the intermediate value 26.50 mm is 4.00.

The construction data and the data related to the aspherical surfaces of the taking lens system 12 are shown below.

EXAMPLE 5 f = 6.00-26.50-117.00
FNO. = 2.88-4.00-4.90

| [Radius of Curvature] | [Axial Distance] | [Refractive Index (Nd)] | [Abbe Number (vd)] |
|---|---|---|---|
| r1 = 61.263 | d1 = 2.500 | N1 = 1.84666 | v1 = 23.78 |
| r2 = 45.347 | d2 = 0.010 | N2 = 1.51400 | v2 = 42.83 |
| r3 = 45.347 | d3 = 4.992 | N3 = 1.49700 | v3 = 81.61 |
| r4 = −574.326 | d4 = 1.044 | | |
| r5 = 47.758 | d5 = 4.095 | N4 = 1.58913 | v4 = 61.25 |
| r6 = 79.399 | d6 = 1.000-28.202-50.891 | | |
| r7 = 37.682 | d7 = 1.500 | N5 = 1.83400 | v5 = 37.34 |
| r8 = 8.819 | d8 = 6.021 | | |
| r9 = −20.677 | d9 = 1.209 | N6 = 1.49700 | v6 = 81.61 |
| r10 = 13.479 | d10 = 0.010 | N7 = 1.51400 | v7 = 42.83 |
| r11 = 13.479 | d11 = 2.769 | N8 = 1.84666 | v8 = 23.78 |
| r12 = 55.128 | d12 = 31.482-7.120-1.149 | | |
| r13 = ∞ (S) | d13 = 2.120 | | |
| r14* = 8.124 | d14 = 2.622 | N9 = 1.53048 | v9 = 55.72 |
| r15 = 46.770 | d15 = 1.750 | | |
| r16 = 15.646 | d16 = 0.892 | N10 = 1.84666 | v10 = 23.78 |
| r17 = 8.111 | d17 = 1.530 | | |

-continued f = 6.00-26.50-117.00
FNO. = 2.88-4.00-4.90

| [Radius of Curvature] | [Axial Distance] | [Refractive Index (Nd)] | [Abbe Number (vd)] |
|---|---|---|---|
| r18 = 20.237 | d18 = 1.952 | N11 = 1.49700 | v11 = 81.61 |
| r19 = −32.104 | d19 = 4.780-12.754-40.179 | | |
| r20* = 12.844 | d20 = 2.455 | N12 = 1.53048 | v12 = 55.72 |
| r21 = 125.441 | d21 = 0.010 | N13 = 1.51400 | v13 = 42.83 |
| r22 = 125.441 | d22 = 1.200 | N14 = 1.62017 | v14 = 24.01 |
| r23* = 32.666 | d23 = 7.751-14.070-1.287 | | |
| r24 = ∞ | d24 = 3.500 | N15 = 1.51633 | v15 = 64.14 |
| r25 = ∞ | | | |

[Aspherical Coefficient]

r14*
 $\epsilon = 1.0000$
 $A4 = -0.13682746 \times 10^{-3}$
 $A6 = -0.72457285 \times 10^{-6}$
 $A8 = -0.87262517 \times 10^{-7}$
 $A10 = 0.33174754 \times 10^{-8}$
 $A12 = -0.60857073 \times 10^{-10}$ r20*
 $\epsilon = 1.0000$
 $A4 = 0.26498358 \times 10^{-4}$
 $A6 = -0.80216661 \times 10^{-5}$
 $A8 = 0.47464775 \times 10^{-6}$
 $A10 = -0.89457829 \times 10^{-8}$ r23*
 $\epsilon = 1.0000$
 $A4 = 0.84078718 \times 10^{-4}$
 $A6 = -0.11462763 \times 10^{-4}$
 $A8 = 0.67249678 \times 10^{-6}$
 $A10 = -0.10297467 \times 10^{-7}$
 $A12 = 0.11715768 \times 10^{-9}$ When the distance from the most object-to-be-photographed side surface r1 of the first lens unit G1 to the imaging surface at the wide angle end is TLw, the overall focal length of the taking lens system 12 at the telephoto end is ft, the overall focal length of the taking lens system 12 at the wide angle end is fw and the focal length of the first lens unit G1 is fl, TLw/ft=0.803 and fl/fw=13.741. Therefore, the relationships of the expressions 1 and 2 are satisfied, and the expressions 1' and 2' are also satisfied.

Moreover, the lens element L3 of the first lens unit G1 is a meniscus lens element having positive optical power, and the Abbe number and the refractive index, to the d-line, of the lens element L3 are 61.25 and 1.589, respectively, as mentioned above. Therefore, the relationships of the expressions 3 and 4 are also satisfied FIG. 12 show aberrations of the taking lens system 12. Although the zoom ratio of the taking lens system 12 of the digital camera 5 according to the present embodiment is as high as 19.5, as is apparent from FIG. 12, the aberrations are excellently suppressed and high imaging performance is obtained. Moreover, the overall length is only approximately 87 mm (at the wide angle end) even when the filter F is included, and the size is thus small. Further, since the number of lens elements is as small as eleven and the number of aspherical surfaces is as small as three, manufacture is easy.

While an example of a digital camera that takes still images is described in the above-described embodiments, the taking lens system of the present invention is applicable to digital video cameras for taking moving images and cameras incorporated in information processing apparatuses such as mobile computers, mobile telephones and PDAS, and its use is not limited.

As described above, the taking lens system that images light from the object to be photographed on the image sensor at least comprises, from the side of the object to be photographed, the first lens unit having positive optical power, the second lens unit having negative optical power, the third lens unit having positive optical power and the fourth lens unit having positive optical power, zooming is performed by moving at least the first lens unit, and the relationships of the following expressions 1 and 2 are satisfied:

$$0.5 \leq TLw/ft \leq 1.0 \quad (1)$$

$$6.0 \leq fl/fw \leq 20.0 \quad (2)$$

where TLw is the distance from the most object-to-be-photographed side surface of the first lens unit to the imaging surface at the wide angle end, ft is the overall focal length of the taking lens system at the telephoto end, fw is the overall focal length of the taking lens system at the wide angle end, and fl is the focal length of the first lens unit.

In a case where a high zoom ratio is ensured, when the value of TLw/ft exceeds the upper limit of the expression 1, the overall length at the wide angle end is large or the angle of view at the wide angle end is large, which is an obstacle to size reduction.

When the value of TLw/ft does not reach the lower limit of the expression 1, the overall length at the wide angle end is too small and the zoom ratio is too high, so that it is difficult to ensure performance. To ensure high performance, it is necessary to increase the number of lens elements or aspherical surfaces, which hinders the facilitation of manufacture.

By satisfying the relationship of the following expression 1' instead of the expression 1, a smaller-size and higher-performance taking lens system is obtained:

$$0.75 \leq TLw/ft \leq 1.0 \quad (1')$$

When the value of fl/fw does not reach the lower limit of the expression 2, the optical power of the first lens unit is strong, so that the generation of aberrations increases, in particular, a curvature of the filed and distortion are largely generated. To excellently correct them, the addition of a lens element or the addition of an aspherical surface is necessary. This is undesirable in the size reduction and the facilitation of manufacture. Moreover, when the value of fl/fw exceeds the upper limit of the expression 2, although this is advantageous in aberration correction, an increase in the diameter of the front lens and the resultant size increase cannot be avoided, which is undesirable.

By satisfying the relationship of the following expression 2' instead of the expression 2, a smaller-size and higher-performance taking lens system is obtained:

$$7.0 \leq fl/fw \leq 17.0 \quad (2')$$

Further, in zooming from the wide angle end to the telephoto end, the second lens unit, the third lens unit and the fourth lens unit are moved so that the distance between the first lens unit and the second lens unit increases, the distance between the second lens unit and the third lens unit decreases and the distance between the third lens unit and the fourth lens unit increases.

That is, by making each lens unit bear the zoom ratio by moving the second, third and fourth lens units in addition to the first lens unit, the size reduction and a higher zoom ratio can be achieved without any significant increase in the number of lens elements.

Moreover, only a fifth lens unit situated on the image sensor side of the fourth lens unit is provided in addition to the first to fourth lens units, and the fifth lens unit is stationary in zooming.

Although it is desirable that the light ray incident on the image sensor be substantially vertical to the image sensor (be telecentric), when the zoom ratio is increased or the overall size is reduced, it is difficult to ensure telecentricity. The addition of the stationary fifth lens unit makes it easy to ensure telecentricity. Moreover, the presence of the stationary fifth lens unit prevents the intrusion of dust which is a significant problem for the image sensor.

The fifth lens unit includes only one lens element having positive optical power. By the fifth lens unit including only one lens element of positive optical power, an increase in overall length and an increase in cost due to an increase in the number of lens elements can be avoided and excellent telecentricity can be ensured. Moreover, it is further desirable that the fifth lens unit include one plastic lens element, because the cost and weight can be further reduced.

Moreover, the first lens unit at least includes one lens element having negative optical power and one lens element having positive optical power, and the relationships of the following expressions 3 and 4 are also satisfied:

$$53 \leq Vdp \quad (3)$$

$$1.58 \leq Ndp \quad (4)$$

where Vdp and Ndp are the Abbe number and the refractive index, to the d-line, of the lens element having positive optical power included in the first lens unit, respectively.

The first lens unit is a unit that is important in deciding the overall length of the lens, significantly influences the correction of chromatic aberration, particularly lateral chromatic aberration, at the telephoto end, and is an element that is high in error sensitivity.

When the value of Vdp does not reach the lower limit of the expression 3, it is difficult to correct aberrations, particularly lateral chromatic aberration at the telephoto end. Moreover, when the value of Ndp does not reach the lower limit of the expression 4, it is necessary to increase the surface curvature to maintain the optical power; consequently, aberrations, particularly a field curvature and distortion at the telephoto end are generated and it is difficult to correct them. In addition, an increase in error sensitivity results.

With these structures, a small-size lens system where the zoom ratio is extremely high and aberrations are excellently suppressed is obtained. Moreover, since it is not necessary to increase the number of lens elements or aspherical surfaces for aberration correction, the lens system can be structured in small size and manufacture is easy. By providing such a taking lens system, a small-size and high-performance image capturing apparatus can be structured at low cost.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A taking lens system that images light from an object to be photographed on an image sensor, said taking lens system comprising:

at least, from a side of the object to be photographed, a first lens unit having positive optical power, a second lens unit having negative optical power, a third lens unit having positive optical power and a fourth lens unit having positive optical power, wherein zooming is performed by moving at least the first lens unit, and the following relationships are satisfied:

$$0.5 \leq TLw/ft \leq 1.0$$

$$6.0 \leq fl/fw \leq 20.0$$

where, "TLw" is a distance from a most object-to-be-photographed side surface of the first lens unit to an imaging surface at a wide angle end, "ft" is an overall focal length of the taking lens system at a telephoto end, "fw" is an overall focal length of the taking lens system at the wide angle end, and "fl" is a focal length of the first lens unit.

2. A taking lens system according to claim 1, wherein in zooming from the wide angle end to the telephoto end, the second lens unit, the third lens unit and the fourth lens unit are moved so that a distance between the first lens unit and the second lens unit increases, a distance between the second lens unit and the third lens unit decreases and a distance between the third lens unit and the fourth lens unit increases.

3. A taking lens system according to claim 1, wherein only a fifth lens unit situated on an image sensor side of the fourth lens unit is provided in addition to the first to fourth lens units, and the fifth lens unit is stationary in zooming.

4. A taking lens system according to claim 3, wherein the fifth lens unit includes only one lens element having positive optical power.

5. A taking lens system according to claim 1, wherein the first lens unit at least includes one lens element having negative optical power and one lens element having positive optical power, and the following relationships are satisfied:

$$53 \leq Vdp$$

$$1.58 \leq Ndp$$

where, Vdp and Ndp are an Abbe number and a refractive index, to a d-line, of the lens element having positive optical power included in the first lens unit, respectively.

6. An image capturing apparatus comprising:

an image sensor; and a taking lens system for forming an image on the image sensor, wherein said taking lens system includes, at least, from a side of the object to be photographed, a first lens unit having positive optical power, a second lens unit having negative optical power, a third lens unit having positive optical power and a fourth lens unit having positive optical power, wherein zooming is performed by moving at least the first lens unit, and the following relationships are satisfied:

$$0.5 \leq TLw/ft \leq 1.0$$

$$6.0 \leq f1/fw \leq 20.0$$

where, "TLw" is a distance from a most object-to-be-photographed side surface of the first lens unit to an imaging surface at a wide angle end, "ft" is an overall focal length of the taking lens system at a telephoto end, "fw" is an overall focal length of the taking lens system at the wide angle end, and "f1" is a focal length of the first lens unit.

7. An image capturing apparatus according claim 6, wherein in zooming from the wide angle end to the telephoto end, the second lens unit, the third lens unit and the fourth lens unit are moved so that a distance between the first lens unit and the second lens unit increases, a distance between the second lens unit and the third lens unit decreases and a distance between the third lens unit and the fourth lens unit increases.

8. An image capturing apparatus according to claim 6, wherein only a fifth lens unit situated on an image sensor side of the fourth lens unit is provided in addition to the first to fourth lens units, and the fifth lens unit is stationary in zooming.

9. An image capturing apparatus according to claim 8, wherein the fifth lens unit includes only one lens element having positive optical power.

10. An image capturing apparatus according to claim 6, wherein the first lens unit at least includes one lens element having negative optical power and one lens element having positive optical power, and the following relationships are satisfied:

$$53 \leq Vdp$$

$$1.58 \leq Ndp$$

where, Vdp and Ndp are an Abbe number and a refractive index, to a d-line, of the lens element having positive optical power included in the first lens unit, respectively.

* * * * *

UNITED STATES PATENT AND TRADEMARK OFFICE
CERTIFICATE OF CORRECTION

PATENT NO.          : 7,489,451 B2
APPLICATION NO. : 11/319872
DATED                  : February 10, 2009
INVENTOR(S)        : Mamoru Terada, Kenshi Nabeta and Toru Nakatani It is certified that error appears in the above-identified patent and that said Letters Patent is hereby corrected as shown below:

Column 22:
line 24, delete "$6.0 \leq fl/fw \leq 20\ 0$" and
      insert -- $6.0 \leq fl/fw \leq 20.0$ --.

Signed and Sealed this

Thirty-first Day of March, 2009

JOHN DOLL
*Acting Director of the United States Patent and Trademark Office*